US007783613B2

(12) United States Patent
Gupta et al.

(10) Patent No.: US 7,783,613 B2
(45) Date of Patent: Aug. 24, 2010

(54) CONTEXT-AWARE MIDDLEWARE PLATFORM FOR CLIENT DEVICES

(75) Inventors: Puneet Gupta, Bangalore (IN); Karthik G V, Karaikal (IN); Kavitha Damodhiran, Coimbatore (IN)

(73) Assignee: Infosys Technologies Ltd., Bangalore (IN)

( * ) Notice: Subject to any disclaimer, the term of this patent is extended or adjusted under 35 U.S.C. 154(b) by 340 days.

(21) Appl. No.: 11/670,918

(22) Filed: Feb. 2, 2007

(65) Prior Publication Data
US 2007/0208686 A1 Sep. 6, 2007

(30) Foreign Application Priority Data
Feb. 3, 2006 (IN) .......................... 176/CHE/2006

(51) Int. Cl.
*G06F 7/00* (2006.01)
(52) U.S. Cl. ...................................... 707/693; 707/805
(58) Field of Classification Search ................ 707/1–10, 707/693, 805
See application file for complete search history.

(56) References Cited

U.S. PATENT DOCUMENTS
6,345,279 B1 2/2002 Li et al.
(Continued)

FOREIGN PATENT DOCUMENTS
EP 1 526 457 4/2005

OTHER PUBLICATIONS

Abrams et al., "UIML: An Appliance-Independent XML User Interface Language," Proceeding of the eighth international conference on World Wide Web, Toronto, Canada, 1999, 18 pages.

(Continued)

*Primary Examiner*—Mohammad Ali
*Assistant Examiner*—John P Hocker
(74) *Attorney, Agent, or Firm*—Klarquist Sparkman, LLP

(57) ABSTRACT

Middleware can accept transaction requests from a client device and tailor the request to a backend transaction server. The server's response can be tailored to the client device. For example, characteristics of the client device such as screen real estate and supported functionality can be taken into account when generating a tailored response. Features such as caching can avoid repeatedly contacting the backend server. Pagination and column truncation can be supported. A transaction model can represent a transaction as device independent configuration information. The transaction model can be added or changed without coding. Useful for implementing an application across a wide range of devices transparently to the backend server.

30 Claims, 40 Drawing Sheets

U.S. PATENT DOCUMENTS

| | | | |
|---|---|---|---|
| 2002/0046294 A1* | 4/2002 | Brodsky et al. | 709/246 |
| 2002/0059139 A1 | 5/2002 | Evans et al. | |
| 2004/0019560 A1* | 1/2004 | Evans et al. | 705/40 |
| 2004/0034853 A1* | 2/2004 | Gibbons et al. | 717/174 |
| 2004/0043763 A1 | 3/2004 | Minear | |
| 2004/0203851 A1* | 10/2004 | Vetro et al. | 455/456.1 |
| 2005/0171811 A1* | 8/2005 | Campbell et al. | 705/1 |
| 2005/0209876 A1* | 9/2005 | Kennis et al. | 705/1 |
| 2006/0004746 A1* | 1/2006 | Angus et al. | 707/4 |
| 2006/0036941 A1* | 2/2006 | Neil | 715/526 |
| 2006/0047665 A1* | 3/2006 | Neil | 707/10 |
| 2006/0277271 A1* | 12/2006 | Morse et al. | 709/217 |
| 2007/0149212 A1 | 6/2007 | Gupta et al. | |
| 2007/0160026 A1 | 7/2007 | Gupta et al. | |
| 2007/0254614 A1 | 11/2007 | Muralidharan et al. | |
| 2008/0034001 A1 | 2/2008 | Noel | |
| 2008/0040488 A1 | 2/2008 | Gupta et al. | |
| 2008/0065648 A1 | 3/2008 | Gupta et al. | |
| 2008/0092122 A1 | 4/2008 | Caprihan et al. | |
| 2008/0212504 A1 | 9/2008 | Venkataraman et al. | |

OTHER PUBLICATIONS

Ali et al., "A Multi-Step Process for Generating Multi-Platform User Interfaces using UIML," Computing Research Repository (CoRR), Nov. 2001, 11 pages.

Gruber et al., Projekt "Celebes," SCCH, Software Competence Center Hagenberg, 2002-2003, visited Jan. 26, 2007, 2 pages.

Gruber, "Generating Adaptive User Interfaces with Meta Interface Description Languages for Device Independent Access," in Ferscha, A., Hörtner, H., Kotsis, G. (eds.)Advances in Pervasive Computing, Austrian Computer Society (OCG), ISBN3-85403-176-9, Apr. 2004, (abstract only), 2 pages.

IBM WebSphere Transcoding Publisher, Version 3.5 for IBM @server iSeries, IBM brochure, 2002, 6 pages.

Vizard, "Everypath brings order to mobile computing," InfoWorld, Jul. 3, 2002, 3 pages.

"WebSphere Everyplace Connection Manager: Increasing mobile security, reducing wireless costs, "IBM White Paper, Jul. 2004, 13 pages.

"WebSphere Transcoding Publisher Version 4.0", www.ibm.com/websphere/transcoding, visited Feb. 1, 2007, 16 pages.

"What is transcoding?—a definition from Whatis.com," WhatIs.com, Feb. 27, 2004, 3 pages.

Kolari, "Kontti—Context-aware Mobile Portal," *ERCIM News*, No. 54, Jul. 2003, 2 pages.

Mandato et al., "CAMP: a context-aware mobile portal," *IEEE Communications Magazine*, (2002) 8 pages.

\* cited by examiner

THE REQUEST XML FOR LOGIN

```xml
<SignonRq>
    <CustLoginId>
        <Type>Text</Type>
        <Title>Login Id</Title>
        <Size>8</Size>
        <Rqd>True</Rqd>
    </CustLoginId>
    <SignOnPswd>
        <Type>Password</Type>
        <Title>Password</Title>
        <Size>8</Size>
        <Rqd>True</Rqd>
    </SignOnPswd>
    <AcctType>
        <Type>Option</Type>
        <Title>Account Type</Title>
        <Options>
            <Option>Savings</Option>
            <Option>Current</Option>
        </Options>
        <Exclusive>True</Exclusive>
    </AcctType>
        <Help>This page facilitates online login to your account. A successful
            login is required to access all the Banking services provided by the
            bank.</Help>
        <Ticker>Login to Finacle Banking</Ticker>
    </SignonRq>
```

FIG. 17

THE RESPONSE XML FROM THE SERVER:

```
<SignOnRs>
    <Status>
        <StatusCode>0</StatusCode>
        <Severity>None</Severity>
        <StatusDesc>Successful Operation</StatusDesc>
    </Status>
    <SignOnRole>Customer</SignOnRole>
    <CustLoginId>kavitha</CustLoginId>
    <SessKey>0.6074850212885755</SessKey>
</SignOnRs>
```

```
<xs:schema xmlns:xs="http://www.w3.org/2001/XMLSchema">
  <xs:element name="LoginRs" />
  <xs:complexType>
    <xs:sequence>
      <xs:element name="LoginName" type="xs:string" />
      <xs:element name="LoginMessage" type="xs:string" />
    </xs:sequence>
  </xs:complexType>
</xs:schema>
```

```
<xs:schema xmlns:xs="http://www.w3.org/2001/XMLSchema">
  <xs:element name="BalanceRs" />
  <xs:complexType>
    <xs:sequence>
      <xs:element name="Records" />
      <xs:complexType>
        <xs:sequence>
          <xs:element name="LoginName" type="xs:string" />
          <xs:element name="AccountId" type="xs:integer" />
          <xs:element name="Balance" type="xs:integer" />
        </xs:sequence>
      </xs:complexType>
    </xs:sequence>
  </xs:complexType>
</xs:schema>
```

FIG. 22

```
<xs:schema xmlns:xs="http://www.w3.org/2001/XMLSchema">
 <xs:element name="StatementRs" />
  <xs:complexType>
   <xs:sequence>
      <xs:element name="LoginName" type="xs:string" />
      <xs:element name="Records" />
       <xs:complexType>
        <xs:sequence>
           <xs:element name="AccountId" type="xs:integer" />
           <xs:element name="AvailedDate" type="xs:integer" />
           <xs:element name="TransAmount" type="xs:integer" />
           <xs:element name="Description" type="xs:string" />
        </xs:sequence>
       </xs:complexType>
   </xs:sequence>
  </xs:complexType>
</xs:schema>
```

FIG. 23

```
<DepAcctTrnInqRq>
    <Ticker>Transaction Enquiry Request</Ticker>
    <Help>You can receive a statement for all your previous transactions from
the given account. A customized statement can be obtained by giving the appropriate inputs for the date and
amount ranges.</Help>
        <CustLoginId>
                <Type>Text</Type>
                <Title>Login Id.</Title>
                <Size>16</Size>
                <Rqd>True</Rqd>
        </CustLoginId>
                <SessKey />
        <DepAcctId>
            <AcctId>
                <Type>Number</Type>
                <Title>Account Id.</Title>
                <Size>16</Size>
                <Rqd>True</Rqd>
            </AcctId>
            <AcctType>
                <Type>Option</Type>
                <Title>Account Type</Title>
                <Options>
                    <Option>Savings</Option>
                    <Option>Current</Option>
                </Options>
                <Exclusive>True</Exclusive>
            </AcctType>
        </DepAcctId>
        <SelRangeDt>
            <Rqd>False</Rqd>
                <Heading>
                    <Type>Display</Type>
                    <Content>Please select a date range</Content>
                    <Rqd>False</Rqd>
                    <Size>12</Size>
                </Heading>
                <StartDt>
                    <Type>Date</Type>
                    <Title>Start Date</Title>
                    <Size>15</Size>
                    <Rqd>False</Rqd>
                </StartDt>
                <EndDt>
                    <Type>Date</Type>
                    <Title>End Date</Title>
                    <Size>15</Size>
                    <Rqd>False</Rqd>
                </EndDt>
        </SelRangeDt>
```

FIG. 25

```xml
<SelRangeCurAmt>
        <Heading>
            <Type>Display</Type>
            <Content>Please select an amount range</Content>
            <Rqd>False</Rqd>
            <Size>12</Size>
        </Heading>
        <LowCurAmt>
            <Type>Number</Type>
            <Title>Lower Amount</Title>
            <Size>6</Size>
            <Rqd>False</Rqd>
        </LowCurAmt>
        <HighCurAmt>
            <Type>Number</Type>
            <Title>Higher Amount</Title>
            <Size>6</Size>
            <Rqd>False</Rqd>
        </HighCurAmt>
</SelRangeCurAmt>
<ChkRange>
        <Heading>
            <Type>Display</Type>
            <Content>Please select a cheque no range</Content>
            <Rqd>False</Rqd>
            <Size>12</Size>
        </Heading>
        <ChkNumStart>
                <Type>Number</Type>
                <Title>Lower Value</Title>
                <Size>10</Size>
                <Rqd>False</Rqd>
        </ChkNumStart>
        <ChkNumEnd>
                <Type>Number</Type>
                <Title>Higher Value</Title>
                <Size>10</Size>
                <Rqd>False</Rqd>
        </ChkNumEnd>
</ChkRange>
</DepAcctTrnInqRq>
```

FIG. 26

```xml
<DepAcctInqRs>
    <Status>
        <StatusCode>0</StatusCode>
        <StatusDesc>Successful Operation</StatusDesc>
    </Status>
    <CustLoginId>kavitha</CustLoginId>
    <Ticker>Transaction Enquiry</Ticker>
    <TableHeader>
                <Type>THeader</Type>
                <Column1>Avail Dt</Column1>
            <Column2>Type</Column2>
           <Column3>Memo</Column3>
              <Column4>Amount</Column4>
    </TableHeader>
     <DepAcctTrnRec>
            <Column1>2002-01-12 23:12:11</Column1>
            <Column2>Credit</Column2>
            <Column3>Inf-Sal</Column3>
            <Column4>Rs.3000</Column4>
    </DepAcctTrnRec>
     <DepAcctTrnRec>
            <Column1>2002-09-09 11:20:10</Column1>
            <Column2>Debit</Column2>
            <Column3>Inf-Sal</Column3>
            <Column4>Rs.1000</Column4>
    </DepAcctTrnRec>
     <DepAcctTrnRec>
            <Column1>2002-10-11 12:11:08</Column1>
            <Column2>Credit</Column2>
            <Column3>Inf-Sal</Column3>
            <Column4>Rs.1000</Column4>
    </DepAcctTrnRec>
     <DepAcctTrnRec>
            <Column1>2003-12-07 20:17:45</Column1>
            <Column2>Debit</Column2>
            <Column3>Inf-Sal</Column3>
            <Column4>Rs.1000</Column4>
    </DepAcctTrnRec>
     <DepAcctTrnRec>
            <Column1>2004-11-10 11:11:28</Column1>
            <Column2>Debit</Column2>
            <Column3>Inf-Sal</Column3>
            <Column4>Rs.10</Column4>
    </DepAcctTrnRec>
     <DepAcctTrnRec>
            <Column1>2004-11-10 11:15:05</Column1>
            <Column2>Debit</Column2>
            <Column3>Inf-Sal</Column3>
             <Column4>Rs.30</Column4>
    </DepAcctTrnRec>
</DepAcctInqRs>
```

```
<SignonRq>
    <Params>
        <ParamName>Action.CustInfo.Signon</ParamName>
        <ParamValue>Y</ParamValue>
        <ParamValuedVarName />
        <ParamPosition>1</ParamPosition>
    </Params>
    <Params>
        <ParamName>CorporateSignonCorpId</ParamName>
        <ParamValue />
        <ParamValuedVarName>CustLoginId</ParamValuedVarName>
        <ParamPosition>2</ParamPosition>
    </Params>
    <Params>
        <ParamName>CorporateSignonPassword</ParamName>
        <ParamValue />
        <ParamValuedVarName>SignOnPswd</ParamValuedVarName>
        <ParamPosition>3</ParamPosition>
    </Params>
    <URL>http://ServerXYZ:8080/AWS/AWSServlet</URL>
</SignonRq>
```

FIG. 30

CONTEXT-AWARE MIDDLEWARE PLATFORM FOR CLIENT DEVICES

BACKGROUND

Enterprises are aggressively pursuing ubiquitous computing solutions. However, a number of challenges stand in the way.

For example, due to the proliferation of different computing devices with a dizzying array of different capabilities, application content needs to be adapted accordingly. As the heterogeneity of target devices increases, adapting the content to support all the devices is a daunting task.

A conventional approach provides a very basic short message service (SMS) approach, where information is provided in plain text in response to an SMS message with certain keywords. Another approach is to follow the Wireless Access Protocol (WAP) model, where information is displayed in a standardized way by providing very basic user interface (UI) capabilities that all WAP devices can support. The WAP approach means that the UI is limited to the most limited WAP device, which can be inefficient.

Yet another approach is to take existing internet web pages and convert them into pages suitable for viewing on different mobile devices. However, such systems simply force fit content that was originally designed for a larger PC display into a smaller space, which leaves much to be desired.

Therefore, there still remains need for a technique to address mobile device diversity. Further, a solution that provides a device agnostic view to the backend can be desirable.

SUMMARY

A variety of techniques can be used for supporting a context-aware middleware platform for client devices. As described herein, a middleware service can receive requests from a client device and relay to a backend transaction server. The response can be tailored to a context for the client device.

As described herein, a transaction model can model transactions of a particular transaction type. For example, the input parameters, how to transform a request into a format supported by a backend server, output parameters, and the like can be indicated in the transaction model. Because the transaction model can be represented by mark up language (e.g., XML), it is possible to define or modify models without coding.

Presentation at the client device can take into account the capabilities of the device. For example, responses to devices having limited screen real estate can be tailored accordingly. User preferences can also be taken into account.

Features such as bandwidth optimization, mandatory fields, tailored date fields, pagination, column truncation, ambient conditions settings, and the like can be supported.

Caching can avoid having to re-contact the backend transaction server.

Logging and user profiles can be supported. Content can be sent to an alternate channel.

Although applicable to a wide variety of scenarios, the technologies are particularly suited to supporting a wireless communication network having many mobile devices of different device types.

Many of the configuration options can be achieved without coding. Thus, a more speedy deployment of an application via the technologies can be accomplished.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 17 is exemplary configuration information for use in generating the user interfaces shown in FIGS. 15 and 17.

FIG. 20 is an exemplary response from a backend transaction server in response to a request, such as that generated via the user interface of FIG. 15, and can be used to generate the user interfaces of FIGS. 18 and 19.

FIGS. 21, 22, and 23 are exemplary schemas for specifying transaction output parameters.

FIGS. 25 and 26 are exemplary configuration information for use in generating the user interface shown in FIG. 24.

FIG. 29 is an exemplary response from a backend transaction server in response to a request, such as that generated via the user interface of FIG. 24, and can be used to generate the user interfaces of FIGS. 27 and 28.

FIG. 30 is exemplary configuration information for use in transforming a request from a client device into a format supported by a backend transaction server.

DETAILED DESCRIPTION

Example 1

Exemplary System Employing a Combination of the Technologies

Figure 1:
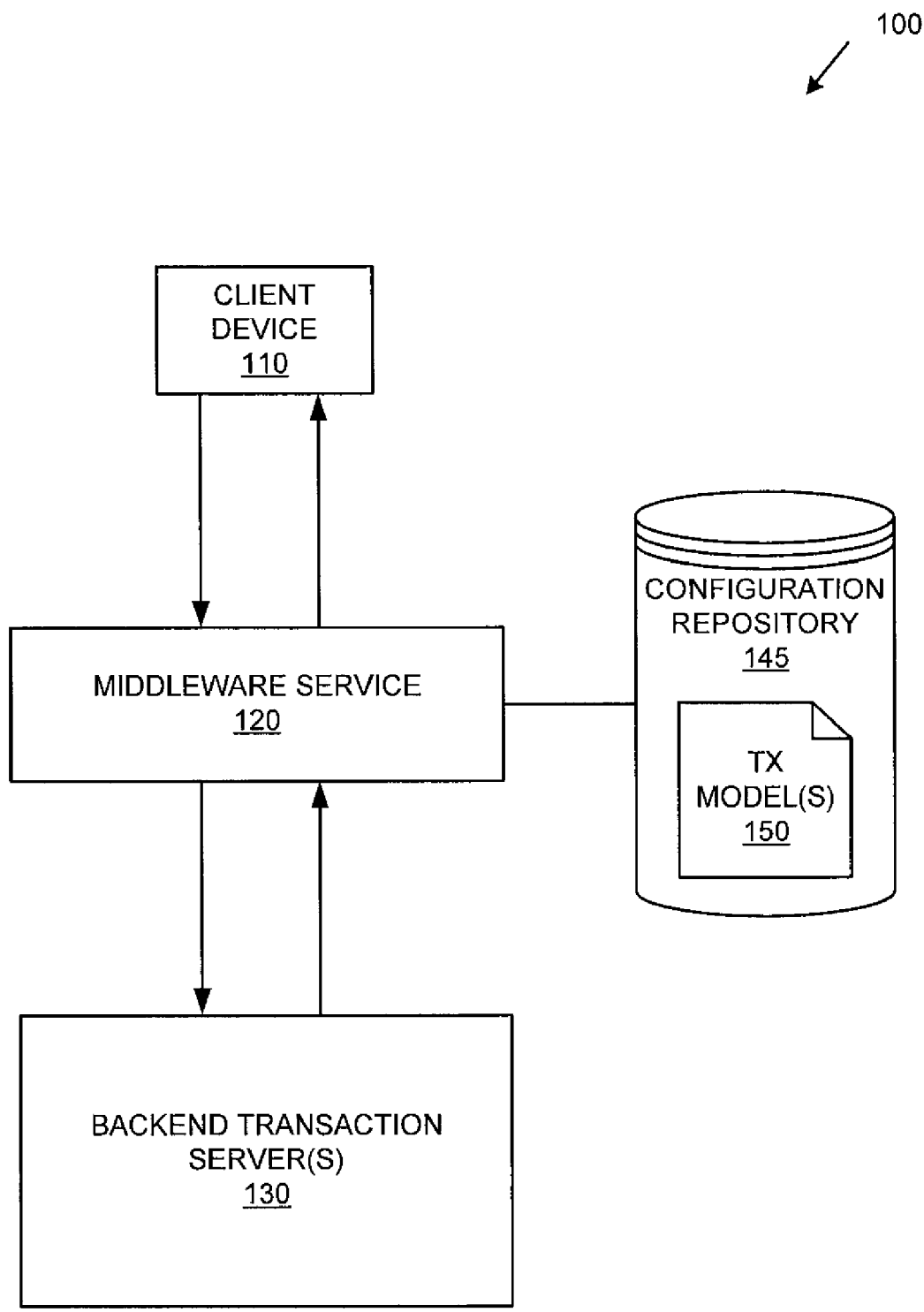
FIG. 1 is a block diagram of an exemplary system comprising a middleware service that facilitates transactions by tailoring responses to the context for a client device.

FIG. 1 is a block diagram of an exemplary system 100 comprising a middleware service 120 that facilitates transactions by tailoring responses to a client device 110 based on the context for the client device 110. The system 100 and variants of it can be used to perform any of the methods described herein.

In the example, the system 100 includes a configuration repository 145 comprising one or more transaction models 150. For example, such a repository can be used to configure the middleware service 120. In some cases, configuration can be achieved without coding (e.g., without having to write or modify executable code). Instead, configuration can be achieved by a user interface presented by an administration console, editing configuration files (e.g., XML), adding or editing the transaction models 150 or the like.

The example also shows one or more backend transaction servers 130 which can process transaction requests that are forwarded from the client device 110 by the middleware service 120. As described herein, information provided in response to a request can be tailored to the context for the client device 110.

In practice, the system 100 can be more complicated, with additional devices, services, servers, repositories, and the like.

Example 2

Exemplary Perspectives

Although some of the examples assume the perspective of the middleware service 120, the methods described herein can be implemented from other perspectives (e.g., from the perspective of the client device 110 or from the perspective of the backend transaction server 130). For example, although the terminology "receiving a request" is used from the perspective of the middleware service 120, such an act could also be described as "sending a request" from the perspective of the client device 110.

Example 3

Exemplary Method Employing a Combination of the Technologies

Figure 2:
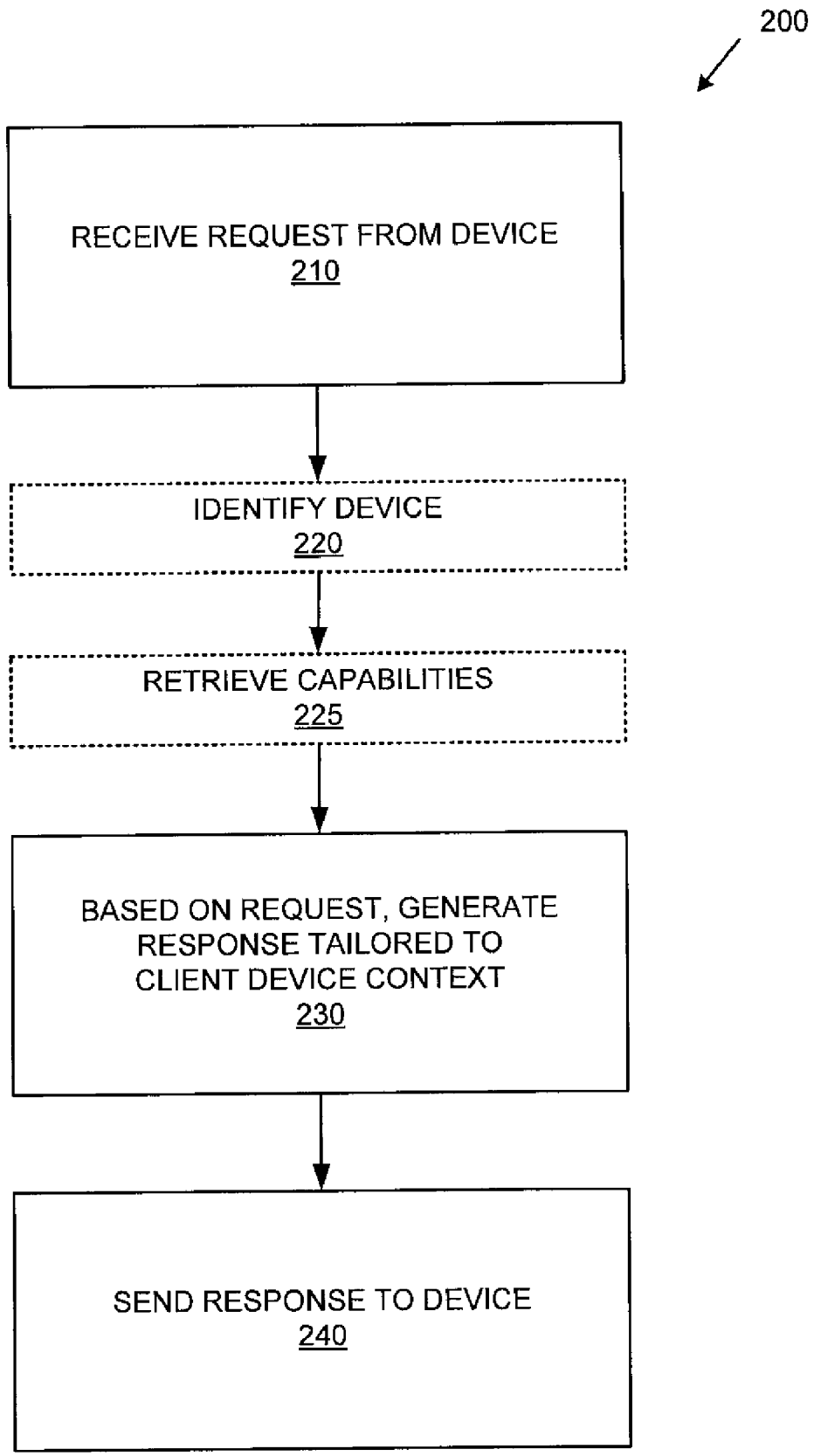
FIG. 2 is a flowchart of an exemplary method of processing a transaction request from a device and sending a response to the device tailored to the context for the device and can be implemented in a system such as that shown in FIG. 1.

FIG. 2 is a flowchart of an exemplary method 200 of processing a transaction request from a client device and sending a response to the device tailored to the context for the device and can be implemented in a system such as that shown in FIG. 1. At 210, a request is received from a client device. At 220, the client device is identified. For example, the type of client device can be identified, or some other identifier can be used. At 225, capabilities are retrieved (e.g., from a repository). As described herein, such capabilities can include device capabilities, browser capabilities, and other custom attributes available via the repository. The actions are shown in dotted boxes because they need not be performed each time a request is received because the device identity or some indication of it can be stored for reuse later (e.g., via a session mechanism as described herein).

At 230, based on the request from the client device, a response is generated that is tailored to the context for the client device. Such an action can rely on a configuration repository as described herein. The tailored response can include content that is to be rendered on the client device as a user interface presentation (e.g., on a display of the client device).

At 240, the tailored response is sent to the client device. It can then be rendered on the client device as a user interface presentation.

The method 200 and any of the methods described herein can be performed by computer-executable instructions stored in one or more computer-readable media (e.g., storage or other tangible media).

Example 4

Exemplary Transaction Processing Comprising Tailoring for Client Device

Figure 3:
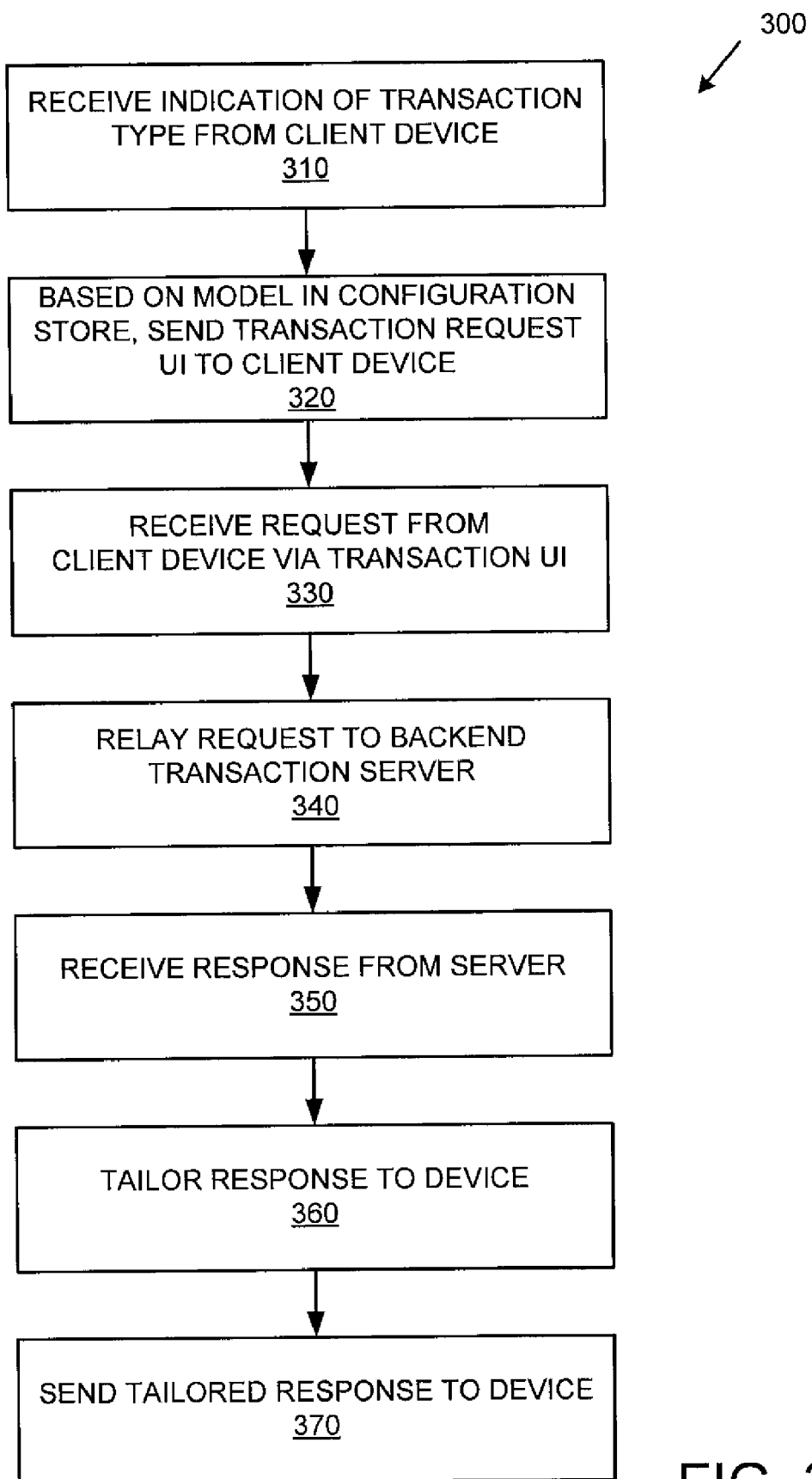
FIG. 3 is a flowchart of an exemplary method of processing a transaction request that comprises processing by a backend transaction server.

FIG. 3 is a flowchart of an exemplary method 300 of processing a transaction request that comprises processing by a backend transaction server. At 310, an indication of a transaction type is received from a client device. For example, a user can indicate the desired transaction by activating a user interface element (e.g., a graphical button, a hyperlink, or the like), visiting a web address (e.g., via an URL), or the like with a client device. As a result, an indication of the transaction type is sent to the middleware service.

At 320, based on a transaction model in a configuration store, information (e.g., markup language) for rendering the transaction request user interface is sent to the client device. Any mechanism by which parameters can be specified (e.g., a fillable (e.g., blank) transaction form (e.g., HTML form) or other user input mechanism) can be used. Sending the information for rendering the transaction request user interface for the transaction type to the client device can be performed via the transaction model without communicating with the back end transaction server. As described herein, the information for rendering the transaction request user interface can be tailored to the client device via a context for the client device.

At 330, a request for a transaction via the filled transaction form is received from the client device. At 340, the request is relayed (e.g., sent or transformed and sent) to the backend server. The server can then process the request to generate a response.

At 350, a response is received from the backend server. At 360, the response is tailored to the client device (e.g., according to a context for the client device). At 370, the tailored response is sent to the client device. The response can then be rendered by the client device as a user interface presentation.

Example 5

Exemplary Client Device

In any of the examples herein, a client device can take the form of an electronic device that can generate a request for processing and receive a response to the request. Responsive to the response, a user interface presentation can be presented on a display of the client device.

For example, a client device can be any computer, mobile computing device, phone, pager, personal digital assistant, or the like. The technologies described herein can be applied with particular advantage to mobile (e.g., wireless) devices because there is wide diversity among such devices in terms of user interface and other features supported. For example, any device which can wirelessly access a communications network (e.g., the internet, a private network, a common carrier network, cellular network, or the like) can be used as a client device which can send transaction processing requests via the network.

In practice, such devices are typically equipped with browsers that are capable of presenting a user interface, accepting user input (e.g., parameters), and sending the user input over the network.

Example 6

Exemplary Middleware Service

In any of the examples herein, a middleware service can serve as a liaison between a client device and a backend transaction server. The service can be provided by one or more computing devices (e.g., general purpose programmable computers) that implement the technologies described herein. The middleware service can accept a request (e.g., via a wireless technique), relay the request to the backend server, receive a response, tailor the response to the client device, and then send it to the client device (e.g., via a wireless technique). In practice, the middleware service can support a variety of protocols (e.g., HTTP, WAP, and the like) in order to be accessible by a variety of client devices. Similarly, the middleware service can interact with the backend server in a variety of ways (e.g., via HTTP or other protocols).

Example 7

Exemplary Applications

In any of the examples herein, a variety of applications can be provided as a service by the middleware service. For example, a wide variety of ecommerce applications (e.g., service, retail, or the like) can be provided such as banking, shopping (e.g., including search, browse, and purchase transactions), reservation (e.g., airline, hotel, restaurant, or the like), and others.

For example, a banking application can be provided as a service which allows transactions such as login, logoff, balance enquiry, statement viewing, and the like to be performed. A retail application can be provided as a service which allows book store transactions (e.g., book searches, get shopping cart, purchases, and the like) to be performed. An airline application can support transactions for reservation/canceling for tickets and flight enquiry for users (e.g., passengers).

Example 8

Exemplary Backend Transaction Server

In any of the examples herein, the backend transaction server can be any of a variety of computer servers providing transaction services. In its simplest form, the transaction server need only provide a response to a request. In practice, the transaction server can access databases and other data sources to respond to the request. Mainframe, mini, or micro technology can be used.

For example, a transaction server can provide services related to banking, shopping, airline reservations, ecommerce, and the like. Exemplary services that are supported typically include user authentication, user account status, user account actions, and the like.

In practice, although it is called a transaction "server," a plurality of server machines (e.g., in a load balancing or failover arrangement) can be used to process requests.

Example 9

Exemplary Transaction

In any of the examples herein, a transaction can comprise simply a request and a response. As described herein, a transaction need not be an action that supports atomicity, consistency, isolation, and durability, or similar functionality. Instead, the transaction may be a simple login, request for account status, request for account information, search, or the like. However, the transaction may be more complex, and may involve atomicity, consistency, isolation, and durability, or similar functionality (e.g., typically managed by the backend transaction server), such as transferring funds between accounts, editing a document, making a reservation, or the like.

Sometimes the term "transaction" is used to denote a transaction type. For example, when a "search transaction" is described, a transaction of type "search" is involved.

Example 10

Exemplary Request

In any of the examples herein, a request can be any sent information for which a response is expected. In practice, the request can be an indication of a desired transaction (e.g., request for a transaction request user interface to perform the transaction), the information for performing the desired transaction (e.g., search criteria, username, date range, or the like), or both. Requests can take the form of URLs or other HTTP requests, but other formats or protocols can be used.

The request can be initiated at the client device by visiting an URL, activating a displayed hyperlink, pressing a virtual button, submitting a virtual fillable form, or the like.

As described herein, a request can be transformed from a format provided by the client device into a format supported by a backend transaction server.

Example 11

Exemplary Transaction Request User Interface

In any of the examples herein, a transaction request user interface can be any mechanism for requesting at transaction. Such a user interface can include a one or more buttons, one or more hyperlinks, one or more fillable forms, or the like.

Example 12

Exemplary Response

In any of the examples herein, a response can be any information sent in response to a request. A response can simply be an indication of the status of the request (e.g., whether it was successful or not). The response can take a more complex form. For example, one or more values can be provided. In the case of responding to a request for a particular transaction type, a response can take the form of information for rendering a transaction request user interface for the transaction type.

A response can include content (e.g., user interface elements) to be rendered as a user interface presentation on a display of the client device. For example, complex responses can include tables, graphics, user interface elements, and the like.

The response can be tailored for display on the client device so that it takes the form of a renderable user interface presentation. When received, the client device can then render the user interface presentation on a visual display screen (e.g., of the client device). The response can include content user interface elements by which further requests can be made.

Example 13

Exemplary Transaction Models

In any of the examples herein, a transaction model can model a transaction of any of a variety of transaction types. As described herein, a transaction model can take the form of a configuration file, such as XML or some other modeling language.

The transaction model can be associated with a particular transaction type. When transactions of a particular type are desired, the respective model can be invoked to perform the transaction. The model can comprise a plurality of parts, such as a specification of input parameters, a specification of how to transform a request with the parameters to a format supported by a backend transaction server, a specification of output parameters, and the like. Thus, the transaction model can indicate how to process communications (e.g., between the client device and the backend transaction server) related to the transaction type.

In practice, an application can be developed by defining the specific transactions for the application in an abstract form. Transaction models for the transactions can then be specified in the configuration repository. The application can then be deployed, and transactions are processed according to the models.

Transaction models can be configured by specifying implied values so that some of the parameters need not be explicitly specified. Thus, new transaction types can be created without having to completely re-define another transaction model. For example, a transaction model of type "last five transactions" can build upon another transaction type (e.g., an enquiry transaction) but specify the parameter implicitly (e.g., without the user having to enter "5").

Although shown as a single file in some of the examples, the transaction model can be distributed throughout different files.

Example 14

Exemplary Transaction Models

Specification of Transaction Input Parameters

In any of the examples herein, a transaction model can include a specification of the transaction input parameters. The specification can take the form of a specification of parameter names, parameter types, and possibly other attributes for the parameters (e.g., size and the like). The specification can also indicate whether the parameters are required.

Although user interface elements can be specified, the specification can be abstract (e.g., not tied to a particular user interface element). For example, if predetermined options are available, they can be specified as options. The middleware service can decide (e.g., based on tailoring functionality) what form of user interface element will be sent for rendering on the client device.

As described herein, date parameters can also be included. Acquisition of date parameters can be done according to the capabilities of the client device.

In order to assist a user, the specification can also include help text, a title, and the like.

Example 15

Exemplary Compound Transaction Models

In any of the examples herein, a transaction model can be configured as a compound transaction model. For example, a plurality of transaction models for different transaction types can be combined into a compound transaction.

In such an arrangement, the parameters for both types can be obtained from the client device as described herein. In some cases, parameters may overlap, so some efficiency may result. The response can be formed by consolidating output for both transactions into a single response.

For example, a transaction model for a "bank balance" transaction type can be combined with a transaction model of a "statement enquiry" transaction type. The resulting compound transaction model can be configured to provide both the bank balance and the last few transactions in the response (e.g. on a single page).

Example 16

Exemplary User Interface Presentation

In any of the examples herein, a user interface presentation can include any presentation of a user interface. Typically, such a user interface can include visible user interface elements such as text, passwords, numbers, number-only passwords, options (e.g., dropdown, popup, comboboxes, and the like), radio buttons, checkboxes, hyperlinks, displayed fields, editable displayed fields, dates, tables, graphical buttons, graphics, drop down menus, and the like. Audio elements such as sounds or music can be included.

A renderable user interface presentation can take the form of a markup language such as HTML, WML, or the like and can also include executable code such as Java, JavaScript, or the like. When rendered, the renderable user interface presentation takes the form of a user interface presentation (e.g., displayed on a client device).

Some user interface elements can be activated by a user (e.g., pressed, checked, clicked, or the like) to denote desired values, parameters, options, actions, or the like.

Example 17

Exemplary Context for Client Device

In any of the examples herein, a context for a client device can include any number of attributes that can affect communications with the client device. For example, when tailoring responses to a client device, the context for the client device can be consulted to determine what form the response should take, what mechanism is used for deliver, and the like.

In practice, the context can include a client device capability context (e.g., user interface context, security context, and the like), a browser context, a user context (e.g., user settings), and the like. Other custom device-specific contexts can be created and updated (e.g., based on testing and validation exercises). The client device capability context can be constructed based on a standard device context based on the type of client device. However, other characteristics and behaviors can be included for a non-standard device (e.g., a device that has been modified, enhanced, upgraded, or the like) in one or more custom device-specific contexts. For example, attributes or characteristics of the device can be determined via discovery techniques and the like.

The context for a client device can be an aggregated context of any of the contexts described herein.

Example 18

Exemplary User Interface Context

In any of the examples herein, a user interface context can indicate the user interface capabilities of the device in question. For example, such capabilities can include screen real estate (e.g., screen size), whether various user interface elements (e.g., images) are supported, whether certain languages are supported, and the like.

Example 19

Exemplary Client Device Capability Context

In any of the examples herein, the context for a client device can indicate the capabilities of the device in question. For example, such capabilities can include user interface capabilities, the browser, whether certain languages (e.g., Java, and the like) are supported, whether certain security features are supported, what input mechanism is supported, deck size, quality of service (e.g., bandwidth) and the like.

The client device context can include the user interface context for the device.

The middleware service can identify the device type (e.g., via analyzing incoming requests) and can also identify other information (e.g., form factors). A queryable device capability repository can store the capabilities for many (e.g., hundreds and growing) devices.

Example 20

Exemplary Client Device Capability Repository

In any of the examples herein, the capabilities of various client devices can be stored in a repository. So that information remains current, it can be retrieved from a service (e.g., in a Service Oriented Architecture or web service arrangement).

Information for common devices can be stored locally to reduce latency.

The repository can indicate the capabilities of a device based on the type of the client device.

Example 21

Exemplary Configuration Repository

In any of the examples herein, configuration of the system (e.g., the middleware service) can be stored in a configuration repository. Such a repository can include homepages for a service, customization information (e.g., logos and the like), templates, transformation instructions, transaction models, and the like.

In many cases, the configuration can be changed without coding (e.g., without having to write or modify executable code). Instead, configuration can be achieved by a user interface presented by an administration console, editing XML files, or the like.

Example 22

Exemplary Tailoring to Client Device Context

In any of the examples herein, information provided to a client device (e.g., a response to a request by the client device) can be tailored according to the context for the device. Such tailoring can include tailoring to the user interface context for the device, or other device capabilities. For example, tailoring can choose communication protocols, security protocols, languages, and the like. The content of a page sent to a client device can be adjusted based on the capabilities of the client device.

Example 23

Exemplary Tailoring to User Interface Context

In any of the examples herein, information provided to a client device (e.g., a response to a request by the client device) can be tailored according to the user interface context for the device. So, for example, in the case of a client device that has limited screen real estate, user interface elements can be omitted or reduced in size.

Tailoring can include formatting a user interface presentation according to the user interface capabilities of the client device, customizing the presentation according to the capabilities of the device, modifying the response according to user preferences or settings, and the like.

For example, some user interface elements (e.g., for inputting parameters and the like), can be designated as mandatory parameters. When tailored to the user interface context, a full or compact user interface presentation can be sent. In the case of a client device with limited screen real estate, some or all of the non-mandatory parameters can be omitted when the response is tailored.

The middleware service described herein can accomplish tailoring by determining the device's capabilities and then tailoring based on the information to be presented and configuration information indicating how to tailor user interface elements, individually or as a group.

As described herein, a wide variety of tailoring functionality can be supported, including column truncation, pagination, reducing graphic quality, avoiding graphics, and the like.

Example 24

Figure 4:
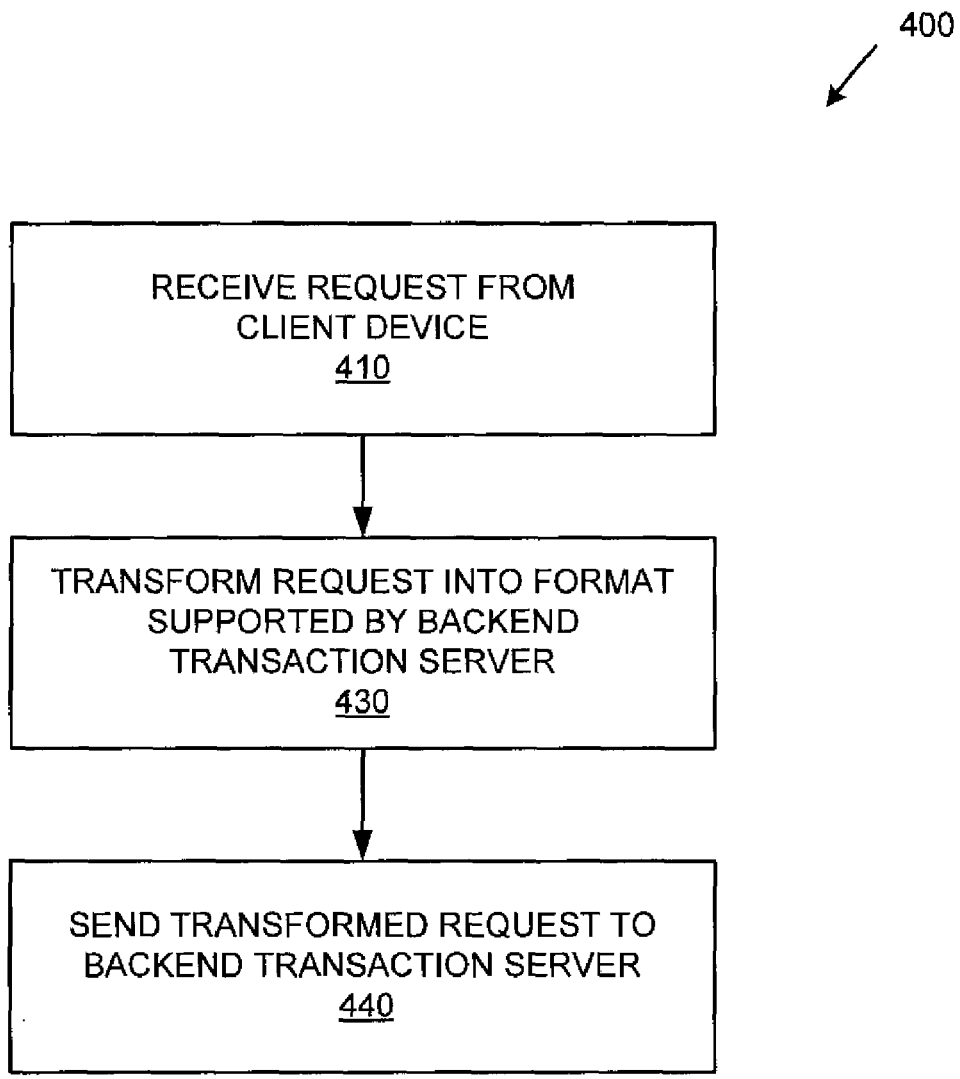
FIG. 4 is a flowchart of an exemplary method of transaction request processing that comprises transforming the request into a format supported by a backend transaction server.

Exemplary Transaction Request Processing Comprising Transforming into Server-supported Format In any of the examples herein, a request from a client device can be transformed (e.g., by a middleware service) into a format supported by a backend transaction server. FIG. 4 is a flowchart of an exemplary method 400 of transaction request processing that comprises transforming the request into a format supported by a backend transaction server. At 410, a request is received from a client device as described herein. At 430, the request is transformed into a format support by a backend transaction server.

For example, as described herein, a request may take the form of a uniform resource locator (URL). Various parameters may be embedded in the URL. A configuration file (e.g., part of the transaction model for the transaction type) can specify how the parameters are to be presented to the backend server. Additional parameters (e.g., specifying the type of request) can also be added during transformation. Additionally a backend URL can be specified to direct the request to the appropriate backend transaction server in a format supported by the server. The URL in the request can be transformed to the specified backend URL At 440, the transformed request is sent to the backend transaction server.

Example 25

Figure 5:
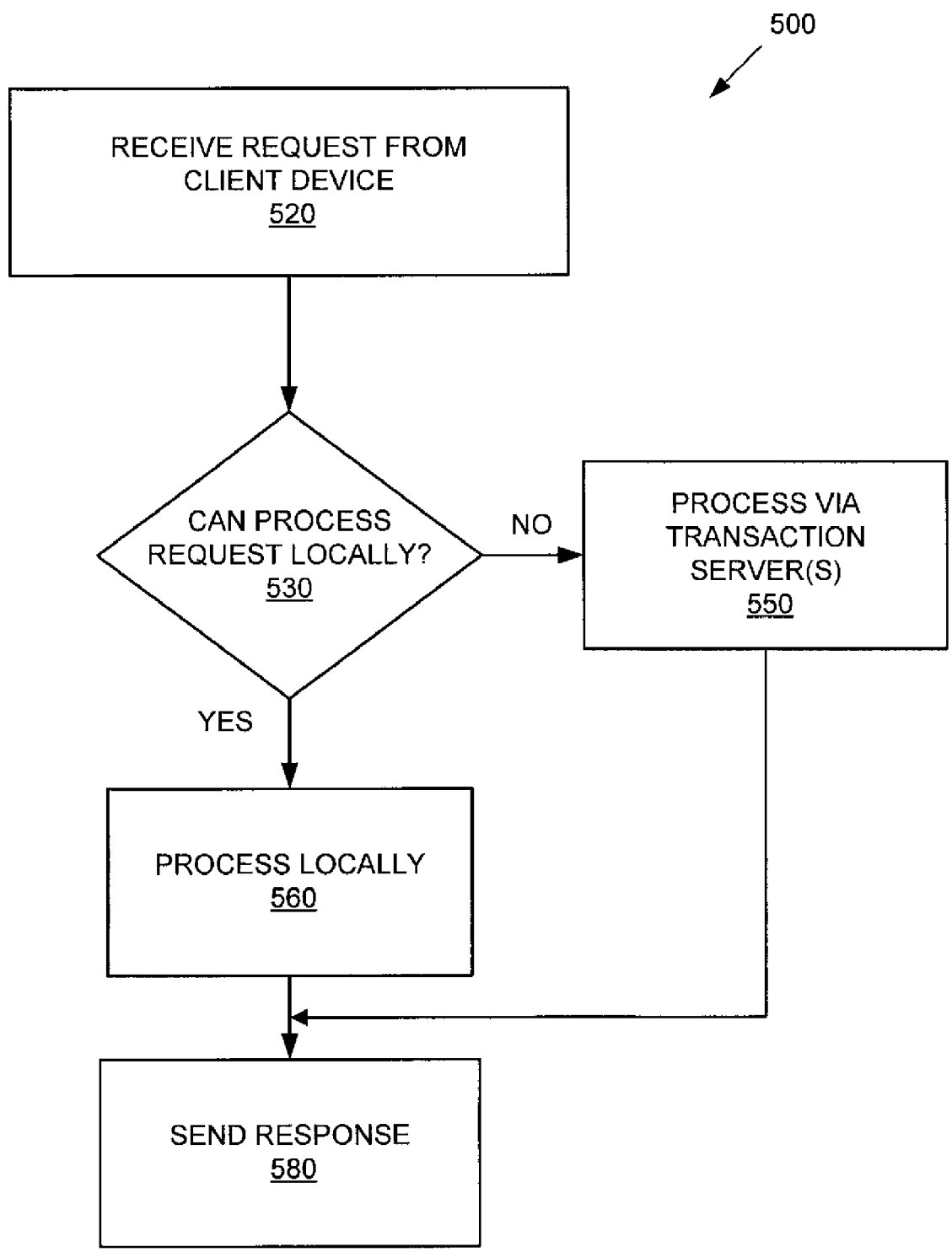
FIG. 5 is a flowchart of an exemplary method of transaction request processing that comprises determining whether the request can be processed locally.

Exemplary Transaction Request Processing Comprising Determining Whether Request can be Processed Locally In any of the examples herein, some requests can be processed locally (e.g., at the middleware service, without having to contact the backend transaction server). FIG. 5 is a flowchart 500 of an exemplary method of transaction request processing that comprises determining whether the request can be processed locally. At 520, a request is received from a client device as described herein. At 530, it is determined whether the request can be processed locally or not. For example, in the case of a request that can be processed without contacting (e.g., by the middleware service) the backend transaction server, the request can be processed locally. Examples can include requests for a page, where the request does not have any transaction parameters (e.g., request for a home page, request for a transaction request user interface, or the like). Additionally, information can be cached by the middleware service to avoid having to contact the backend transaction server. Such information can include pagination, truncated columns, and the like.

At 550, if the request could not be processed locally, it is processed via one or more backend transaction servers. Otherwise, at 560, it is processed locally (e.g., by the middleware service). For example, a response can be generated and tailored to the context for the client device as described herein.

At 580, a response (e.g., tailored to the user interface of the client device) is sent to the client device.

Example 26

Exemplary Method Transaction Request Processing Comprising Alternate Channel

Figure 6:
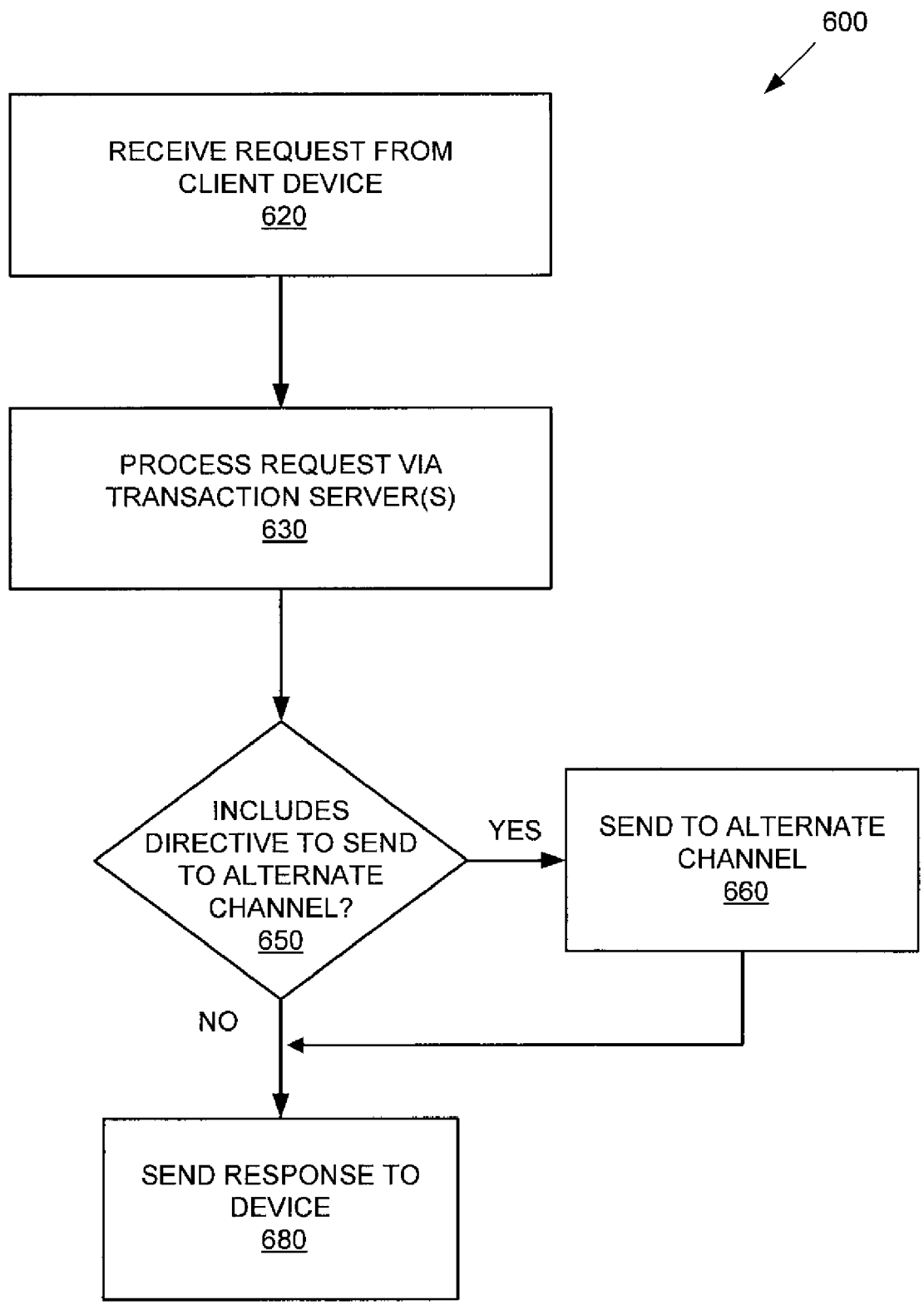
FIG. 6 is a flowchart of an exemplary method of transaction request processing that comprises sending a response to an alternate channel.

In any of the examples herein, the client device can specify an alternate channel for delivery of a response. For example, a user may specify via a user interface option that a response via an alternate channel is desired. The type of alternate channel can also be specified. FIG. 6 is a flowchart of an exemplary method 600 of transaction request processing that comprises sending a response to an alternate channel.

At 620, a request from a client device is received. If appropriate, the request is then processed via one or more backend transaction servers at 630.

At 650, it is determined whether the request includes a directive to send a response to an alternate channel. If so, at 660, a response is sent to the alternate channel. At 680, a response is sent to the client device.

The response to the alternate channel can be of the same or a different format than the client device. For example, the response can be tailored to the user interface characteristics of the alternate channel or some other technique can be used.

Example 27

Exemplary Alternate Channel

In any of the examples herein, responses can be sent to any of a variety of alternate channels. For example, SMS to a mobile device (e.g., the client device or another device), email, fax, pages to a pager, and the like can be used.

For example, a user may ask that a phone number be sent via SMS to a mobile telephone, a table can be sent via email, a document can be faxed, or the like.

Example 28

Exemplary Notifications via Alternate Channel

In any of the examples herein, a user can also specify notification via an alternate channel. For example, upon detection of fulfillment of certain criteria, a notification can be sent via the alternate channel. In practice, such functionality can take the form of sending a notification (e.g., via SMS) when a condition is detected (e.g., a stock price reaches a threshold).

Example 29

Exemplary Bandwidth Optimization

In any of the examples herein, it may be desirable to selectively control a response's size due to the amount of network bandwidth available to a client device. For example, some users can be billed based on the bandwidth utilization (e.g., bytes transferred to the device). A user can specify a choice between various bandwidth modes, which can be stored as a setting (e.g., in the session, in the user profile, or the like).

For example, one arrangement is to have three modes: high (e.g., default), medium, and low. In high mode, images in responses (e.g., pages rendered on the device) can be color images and are good in resolution. In medium mode, images are in black and white, low resolution, or both, which can result in significant bandwidth savings. In one case, savings of 40% were observed.

In low mode, images are represented via plain text, which can result in even more significant bandwidth savings. In one case, savings of 70-80% were observed.

In addition, the middleware service can determine the bandwidth and automatically throttle the mode. However, a user can override the automatic throttling by specifying an overriding preference if desired. For example, a user can specify that high mode or graphics are always desired or low mode or no graphics are always desired.

Example 30

Exemplary Method of Transaction Request Processing Comprising Pagination Functionality In any of the example herein, a response can be tailored to the context for a client device by invoking pagination functionality. For example, a user may not wish to wait for an entire lengthy response. Or, presenting the entire response becomes cumbersome for the user. For example, many records in response to a request can result.

Figure 7:
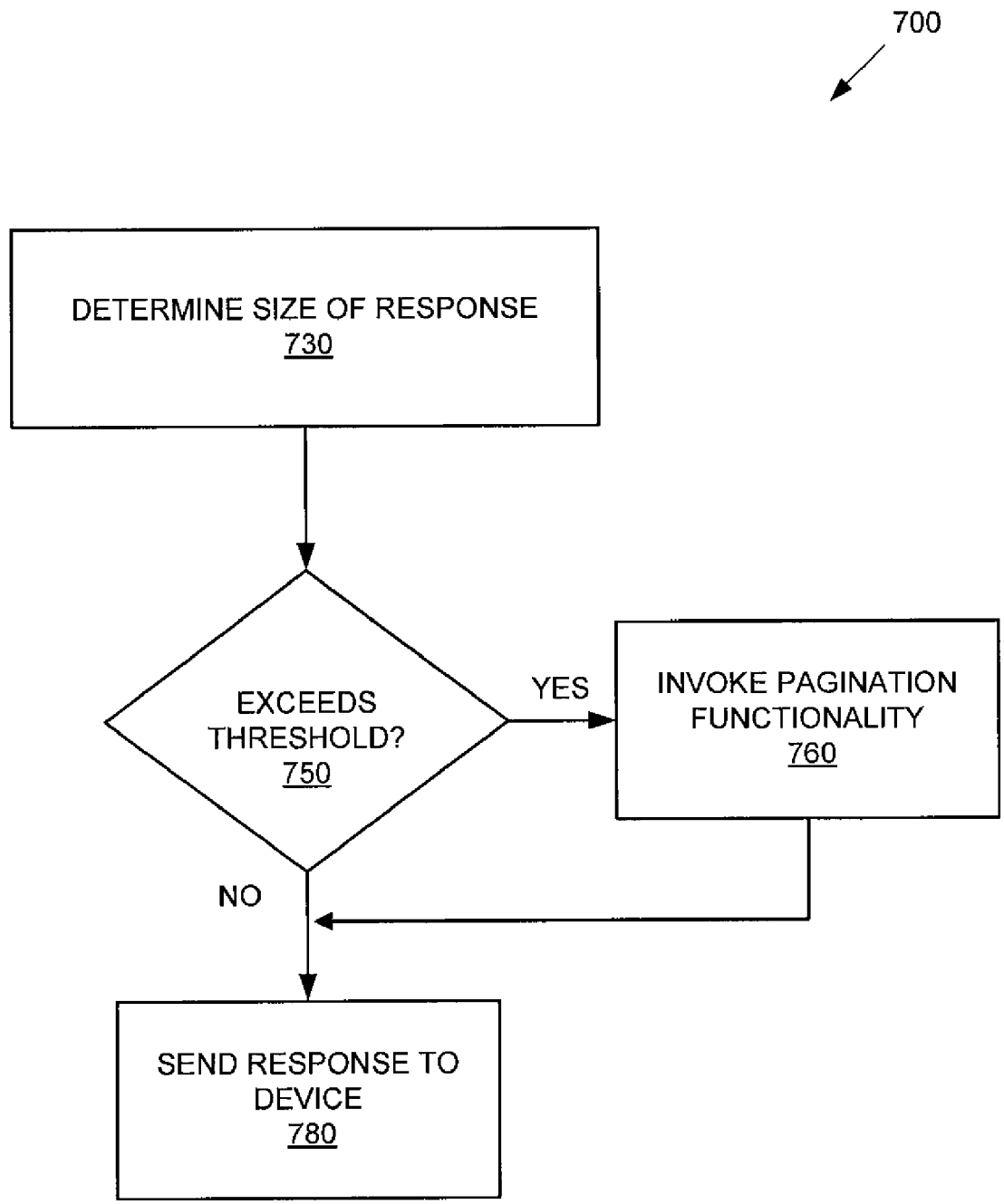
FIG. 7 is a flowchart of an exemplary method of transaction request processing that comprises pagination functionality.

The response can be broken into pages and sent as pages through which the user can navigate (e.g., via presented user interface elements such as "next," "previous," and the like). FIG. 7 is a flowchart of an exemplary method 700 of transaction request processing that comprises pagination functionality. At 730, the size of the response is determined. The size can be measured in terms of bytes, screen real estate required, or both. At 750, it is determined whether the size exceeds a threshold. The threshold can be in terms of bytes, screen real estate (e.g., number of rows it is capable of displaying, total size, or the like), or both. The threshold can be determined as appropriate based on the capabilities of the client device to which the response is to be sent (e.g., as stored in a session data structure). For example, the threshold can be configured by modifying the configuration files described herein.

If the size exceeds the threshold, pagination functionality is invoked at 760. The response is then sent to the device at 780. If pagination functionality has been invoked, the response will contain a subset of the entire response.

The entire response can be stored locally (e.g., cached by the middleware service). When subsequent requests are received for pages, the backend transaction server need not be contacted.

The pagination functionality can be particularly helpful when a client device has a limited bandwidth connection. Instead of having to wait for the entire response over a limited bandwidth connection, a subset of the information can be presented more immediately.

Example 31

Exemplary Session Functionality

In any of the examples herein, session information for a communications session can be stored and managed to maintain state for the communications session. For example, such information can include one or more of the following: client device type, client device capabilities, cached information, a unique session key, user settings, or the like. The information can be stored in a session data structure. Another session management interface can be used for coupling with the backend transaction server.

Other information (e.g., values of variables, parameters, or the like) can also be stored as part of a session and drawn upon when the middleware service serves as a liaison between the client device and the backend transaction server.

Example 32

Exemplary Communications Arrangement Comprising Parameters

Figure 8:
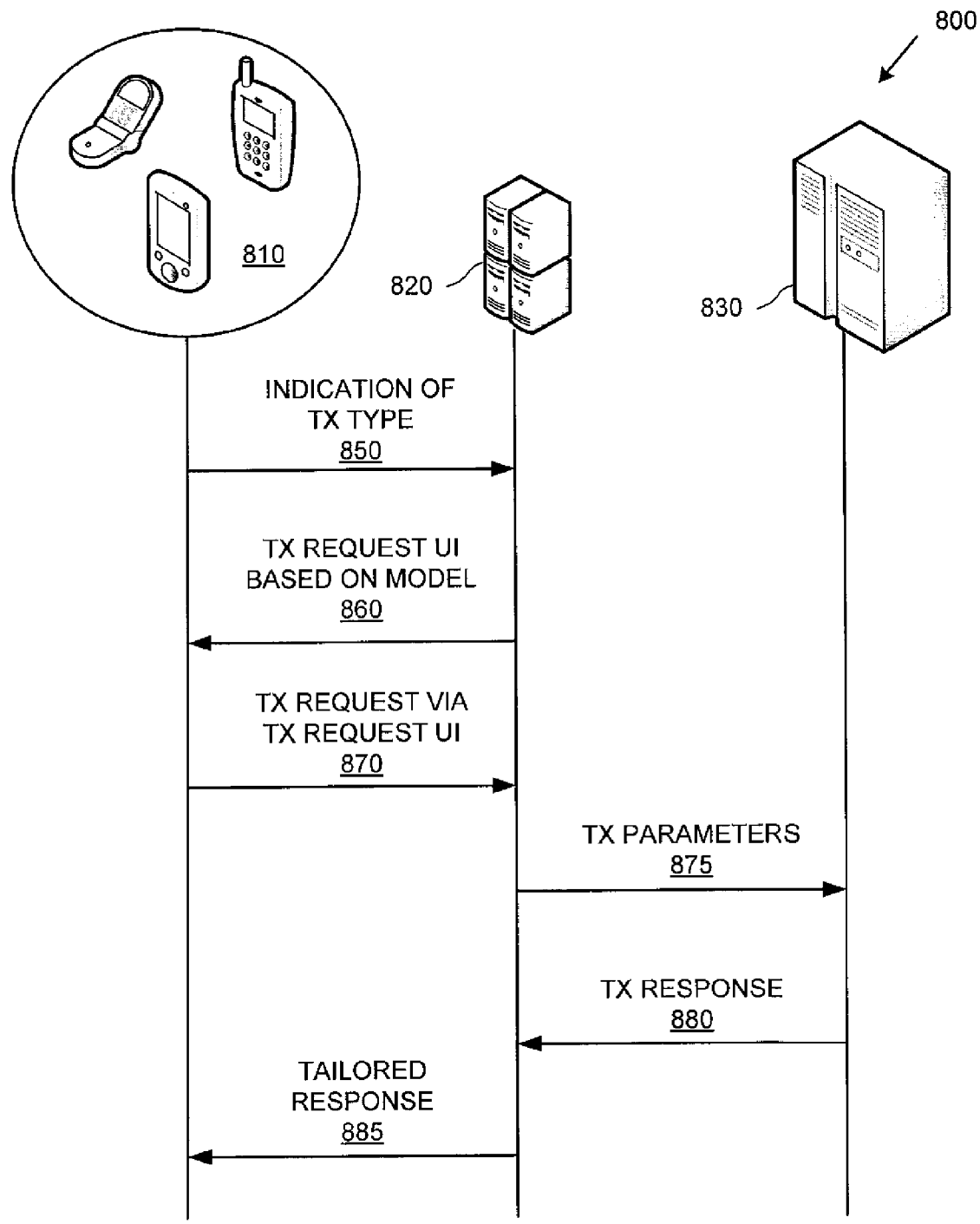
FIG. 8 is a block diagram showing communication of parameters among a client device a middleware service, and a backend transaction server.

In any of the examples herein, parameters can be communicated to a backend transaction server for determining an appropriate response. FIG. 8 is a block diagram 800 showing communication of parameters among a client device 810 a middleware service 820, and a backend transaction server 830. In practice, there can be additional communications (e.g., a login or the like).

At 850, an indication of a desired transaction type is sent by the client device 810. In response, information for rendering a transaction request user interface based on a transaction model for the transaction type is sent at 860. The user can then request the transaction with the transaction request user interface via the client device 810, which sends the transaction request back to the middleware service 820 at 870. For example, the transaction request can include information (e.g., parameters) from a filled form, hyperlink, button, or the like.

Parameters from the transaction request can be sent to the backend transaction server 830 at 875. Parameters can be extracted from the transaction request, and additional parameters can be added as described herein. Such a technique is sometimes called "transforming the request." The backend transaction server 830 can then send a response as appropriate (e.g., based on the parameters) at 880. The middleware service 820 can than tailor the response to the context for the client device 810, and send the tailored response at 885.

Additionally, a template can be used to give the tailored response a look and feel as desired. Logos and the like can be included in the tailored response.

Example 33

Figure 9:
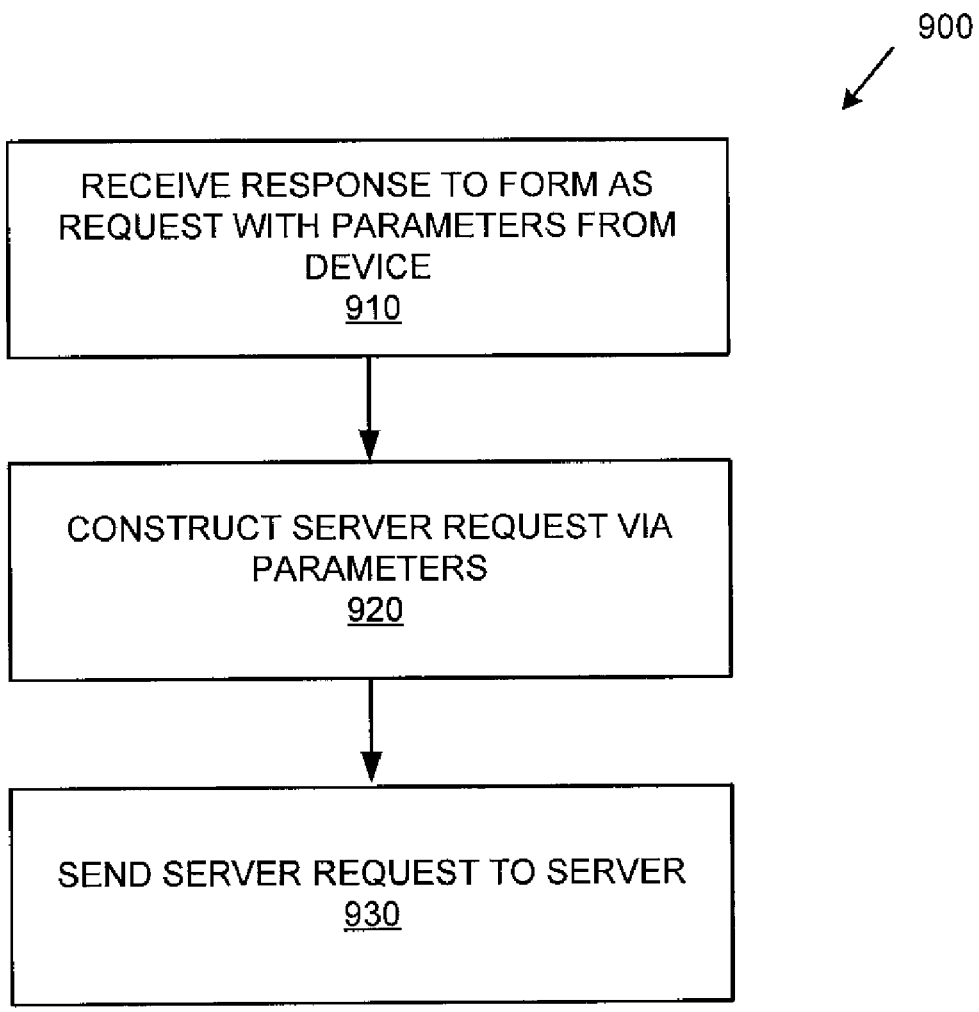
FIG. 9 is a flowchart of an exemplary method of processing a transaction request that comprises constructing a backend transaction server request via parameters.

Exemplary Method of Transaction Request Processing Comprising Backend Request via Parameters FIG. 9 is a flowchart of an exemplary method 900 of transaction request processing that comprises conducting a backend transaction server request via parameters. At 910, a response to a form as a request with parameters is received from the client device. At 920, the request is transformed by constructing a server request via the parameters. At 930, the transformed request is sent to the server. Typically, a response is then received, which is tailored and sent to the client device.

As described herein, parameters can be extracted from the request from the client device. The parameters can be mapped (e.g., to different names), and additional parameters (e.g., the type of request, a session identifier, and the like) can be added to the request before it is sent to the backend transaction server.

As described herein, transformation (e.g., extraction, mapping, adding, and the like) can be achieved via configuration files. For example, XML can specify how to map or add parameters. In this way, coding need not be done to specify or change how parameters are handled. An exemplary implementation herein describes using an XML configuration file (e.g., RequestConfig.xml), but other mechanisms can be used.

Example 34

Exemplary Response Template

Figure 10:
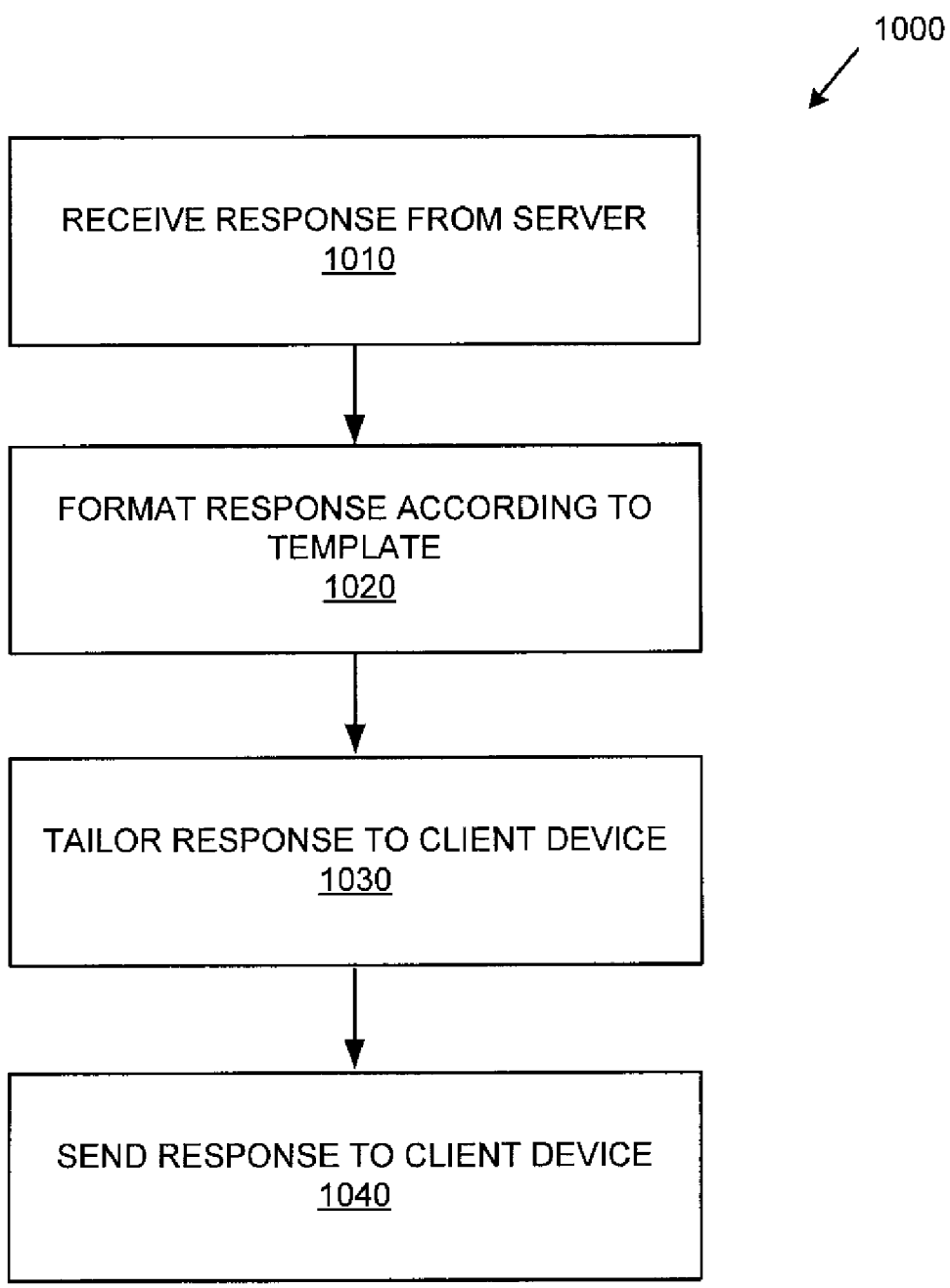
FIG. 10 is a flowchart of an exemplary method of processing a response from a backend server by formatting the response according to a template.

In any of the examples herein, a response from a backend transaction server can be formatted according to a template. FIG. 10 is a flowchart of an exemplary method 1000 of processing a response from a backend server by formatting the response according to a template.

At 1010, a response is received from a backend transaction server. At 1020, the response is formatted according to a template. For example, the response can be encapsulated into a template. Such an approach is useful to include user interface elements that are uniformly desired (e.g., logos, powered-by designations, OK buttons, a user interface element for setting bandwidth preferences, and the like).

Additionally, the template can specify how information in a response from the backend server is to be presented. For example, when status information is provided, the template can specify that it is to appear as text after a heading (e.g., "Status Info").

At 1030, the response is tailored to the context for the client device, and the tailored response is sent to the client device at 1040.

Templates can be stored as part of the configuration repository as described herein.

Example 35

Exemplary Table Column Truncation

It is possible that a response from the backend transaction server would result in a table having many columns. Given the limited screen real estate of many client devices, the columns likely will not fit or will not fit well (e.g., without horizontal scrolling) on the device's display. For example, some results may be twice or thrice greater than the screen width.

In any of the examples herein, a smart fit feature can be employed. When a response involves a plurality of columns, the response tailoring can include truncating one or more of the columns in the tailored response. As a result, fewer columns are displayed at the client device.

Determining which columns to truncate can be done in a variety of ways (e.g., by a priority or mandatory field or by displaying the first, left-most columns only). For example, truncation can be configured at the server or left to be determined by the middleware service.

In order to facilitate display of the truncated columns, a hyperlink can be presented in the displayed table. For example, one of the columns of a record can have a hyperlink associated with the respective record. The hyperlink can be superimposed on data being displayed in the column, a separate hyperlink, or the like. Responsive to activation of the hyperlink, information for the truncated columns (e.g., for the respective record) can be displayed, or information for all columns (e.g., for the respective record) can be displayed. The hyperlink can navigate to a separate page or a popup window.

The backend server need not be contacted to retrieve information for the truncated columns because the information can be cached locally by the middleware service. Caching can take advantage of the session mechanism supported by the middleware service.

Depending on the capabilities of the client device and its browser, the information can be stored at the device or browser level, avoiding the need to contact the middleware service.

Example 36

Exemplary Mandatory Interface Elements

In any of the examples herein, responses can include a designation of mandatory (e.g., required) user interface elements. For example, when filling out a form, some fields may be designated mandatory.

Because the screen real estate differs for different devices, a determination of whether to display a particular user interface element can be made in light of the client device context. Based on the determination, the element can be displayed or not displayed. For example, a threshold screen size can be used, or configuration information (e.g., for a device type or screen size) can store a setting.

A compact mode can display only the mandatory user interface elements (e.g., fields which require inputs from the user). A full mode can include non-mandatory elements as well.

Example 37

Exemplary Date User Interface Elements

In any of the examples herein, responses can include user interface elements related to a date field. For example, a user may be asked to enter one or more dates. The date fields can be rendered differently for different client devices based on their capabilities. Part of tailoring a response to the client device can include choosing an appropriate user interface mechanism by which dates are entered.

A calendar popup can be provided for a device that supports it. A drop down can be provided for other devices, and an ordinary text field can be used for devices as appropriate (e.g., devices for which the drop down selection is cumbersome to the user).

Configuration information can be used to determine which mechanism is appropriate for which user device type.

Example 38

Exemplary Security Context

In any of the examples herein, a client device context can include its support of security features. For example, a device may support secure communication protocols such as HTTPS, SSL, or the like, as indicated in the device capability repository. The client device context can indicate which protocols are supported, and interaction with the device can be tailored based on the supported protocol. For example, if HTTPS is supported, communication with the device can proceed using HTTPS.

If desired, different responses can be presented (e.g., different templates chosen) based on the supported protocol.

Example 39

Exemplary Ambient Conditions Setting

In any of the examples herein, client device context can include an indication of ambient (e.g., lighting) conditions. For example, a user viewing a screen in bright sunlight may wish content to be rendered differently than a user in a dark meeting room. A user can choose an ambient conditions setting from a list of conditions. Color combinations for the settings can be implemented based on research on colors that best suit various conditions (e.g., indoor, outdoor, and the like).

When tailoring responses to the device, colors associated with the chosen ambient conditions setting can be used.

Example 40

Exemplary Administration

In any of the examples herein, an administration console can be provided by which configuration settings can be changed. Via the console, a user can employ a user interface (e.g., presented as web pages on a browser) that will allow limiting services for a particular device type, defining mandatory and non-mandatory fields, adding and removing attributes (e.g., XML attributes) for a particular service, or the like.

In many cases, configuration can be achieved without coding.

Example 41

Exemplary Logging

In any of the examples herein, logging functionality can be implemented which logs requests and responses (e.g., at the middleware service). Such logging can be helpful when a vendor wishes to charge users based on usage, services used, or the like.

An audit log can be kept as well. Based on the type of request, the requests can be logged into corresponding log files as well. For example, if a balance enquiry request hits a bank server, then the request can be logged into the audit log and also into the balance log file. Other services can have separate log files.

Example 42

Exemplary User Profiles

In any of the examples herein, users can customize and personalize applications and can maintain their own profiles (e.g., to store settings for the user).

Example 43

Exemplary Smart Client/Occasionally Connected Client

As part of the middleware service, a Java client can be implemented that modifies itself based on the application configuration. So, changes to the Java client are not needed when changes are implemented at the service, configuration, and the like.

Example 44

Exemplary Data Compression

Data compression can be implemented in a generic way from the perspective of the client device. There need be no decompressor at the client side. Compression can work with bandwidth optimization and help in achieving reduction in the bytes of data to be transferred. As far as the Java client is concerned, data can be compressed significantly (e.g., if a smart client supports decompression).

Example 45

Exemplary Caching/Pre-Fetching

Frequently used pages and static pages can be locally cached. Even some dynamic data can be locally cached (e.g., when using smart fit, pagination, and the like). Pre-fetching and T-9 dictionary can also be enabled. Factors such as bandwidth, device capability, user preference, and the like can be used to determine how to apply such technologies.

Example 46

Exemplary Configuration

Figure 11:
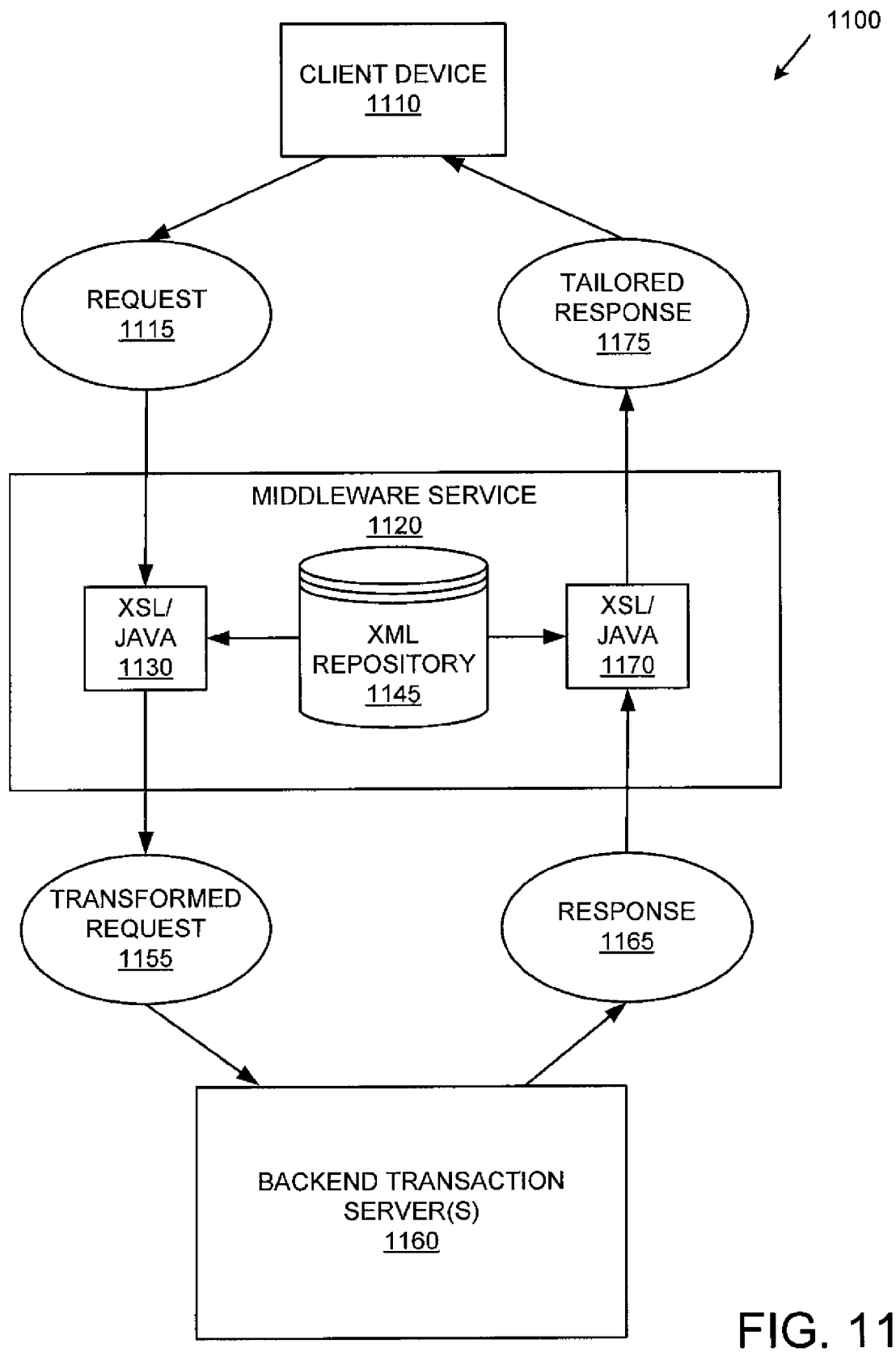
FIG. 11 is a block diagram of an exemplary system comprising a configurable middleware service that facilitates transactions by tailoring responses to a client device according to a context for the client device.

FIG. 11 is a block diagram of an exemplary system 1100 comprising a configurable middleware service 1120 that facilitates transactions by tailoring responses to a client device 1110 according to the context for the client device 1110. The example includes a client device 11110, a middleware service 1120, and one or more backend transaction servers 1160. In practice, additional client devices can be supported.

The client device 1110 is configured to send a request 1115 to the middleware service 1120. The middleware service 1120 can employ a backend-directed tailoring engine 1130 (e.g., scripts (e.g., XSL scripts), programming logic (e.g., Java), or the like) to generate a transformed request 1155 from the request 1115. Any of the transformation technologies described herein can be employed. Transformation can be controlled via a configuration repository 1145, which is XML in the example. In this way, transformation can be altered as desired (e.g., new parameters can be specified, parameter names can be changed, different parameter mappings can be achieved) without coding (e.g., via transaction models).

Upon receipt of the transformed request 1155, the backend transaction server 1160 can generate a response 1165 and send it to the middleware service 1120. The middleware service 1120 can then tailor the response 1165 into a tailored response 1175 according to the capabilities (e.g., context) of the client device 1110.

As shown, the middleware service 1120 can employ a client device-directed tailoring engine 1170 (e.g., scripts (e.g., XSL scripts), programming logic (e.g., Java), or the like) to generate the tailored response 1175 from the response 1165. Any of the tailoring technologies described herein can be employed. Tailoring can be controlled via a configuration repository 1145, which is XML in the example. In this way, tailoring can be altered as desired (e.g., thresholds can be changed, different templates can be used, homepages can be changed, and other settings can be altered) without coding (e.g., via transaction models).

As described herein, support for new client device types can be added without coding by adding appropriate information into the configuration repository 1145. As described herein, capabilities for new devices can be retrieved from an external service.

Example 47

Exemplary Method of Introducing a New Application

Figure 12:
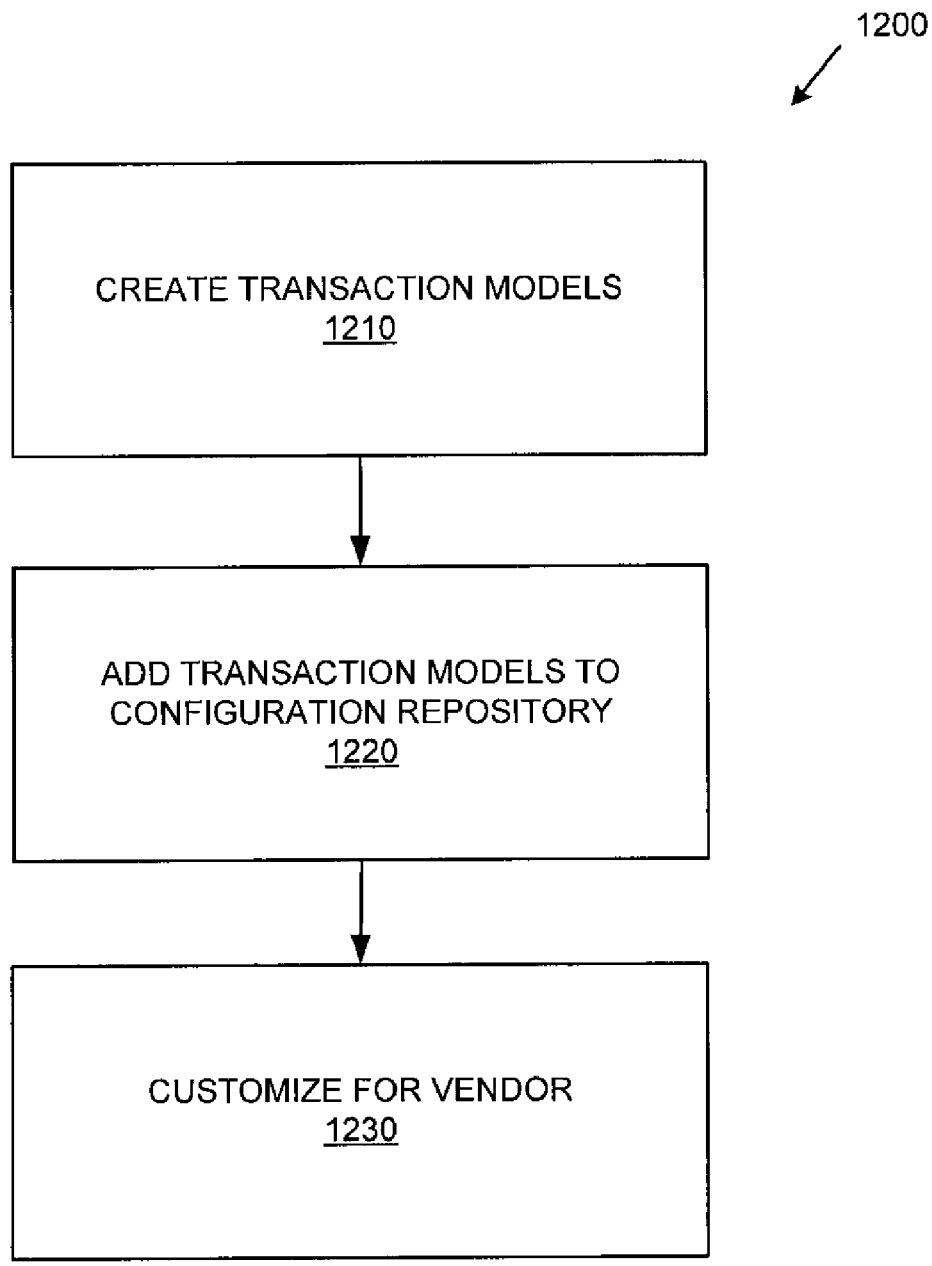
FIG. 12 is a flowchart of an exemplary method of introducing a new application supporting the technologies described herein.

Due to the architecture of the technologies described herein, it is possible to add a new application (e.g., service)

without coding. FIG. 12 is a flowchart of an exemplary method 1200 of introducing a new application supporting the technologies described herein.

At 1210, one or more transaction models of the transactions for the service are created. For example, XML as shown in the examples herein can be defined for specifying input parameters, response transformation, and output parameters.

At 1220, the transaction models are added to the configuration repository (e.g., of the middleware service). For example, additional files can be added, or existing ones edited to include information for the new supported application (e.g., URLs, parameter mappings, and the like).

At 1230, the application (e.g., its appearance) is customized appropriately for the vendor. For example, a logo can be added. Other elements such as look and feel (e.g., color scheme, graphics, or the like) can be included as well. Templates can provide such functionality and can be implemented via the configuration repository.

Other configuration (e.g., enabling sessions) can also be accomplished by modifying the configuration repository if desired The technologies herein can be used as described to launch a mobile version of a conventional application that is already in place. Thus, although the application is called "new," it can be a different version of an existing application.

If desired, the backend transaction server can be modified as appropriate (e.g., to accept connections from the middleware service). However, coding is not required to introduce the new application. The administration console described herein can be used to introduce the new application. Existing applications can be reconfigured in a similar manner.

Transactions according to the application can then be processed as described herein.

Example 48

Exemplary Optimization

In any of the examples herein, a response sent to a client device can be optimized (e.g., tailored) according to the context for the client device. Although the term "optimization" is used, the resulting response need not be the absolute best response, but the response can be tailored according to the context for the client device, based on the device's strengths and weaknesses.

In any of the examples herein, optimization can be done based on screen size, font sizes, or both. Different table structures can be created, scroll bars can be managed, and UI element types such as drop downs can be managed based on context. Different levels of detail can be sent based on context. For example, UI mechanisms for obtaining non-mandatory parameters can be stripped out or omitted based on context.

Optimization can also include pagination, pre-filling UI elements, managing image resolution, and managing color depth based on context. Content directed to different kinds of execution engines (engines that can execute scripts, AJAX, java applets, ActiveX controls, and the like) can be employed based on the context.

The content type such as different markup languages (e.g., HTML, CHTML, XHTML, and the like) can be selected based on the device type, browser type, or both. Differing levels of validation codes can be provided based on available support, security levels, and the like.

Optimization behavior can be modified via changing configuration parameters in the middleware service (e.g., without coding). For example, configuration parameters in a configuration store can indicate which content types are to be presented based on context.

Example 49

Exemplary Access

Access to an application or any one or more of its transaction types can be controlled based on client device type and user type. For example, an application can be configured so that only certain client device types can perform certain transaction types. Similarly, certain transaction types can be limited to certain users or groups of users (e.g., managers, VIPs or the like).

Example 50

Exemplary Implementation

Architecture

Figure 13:
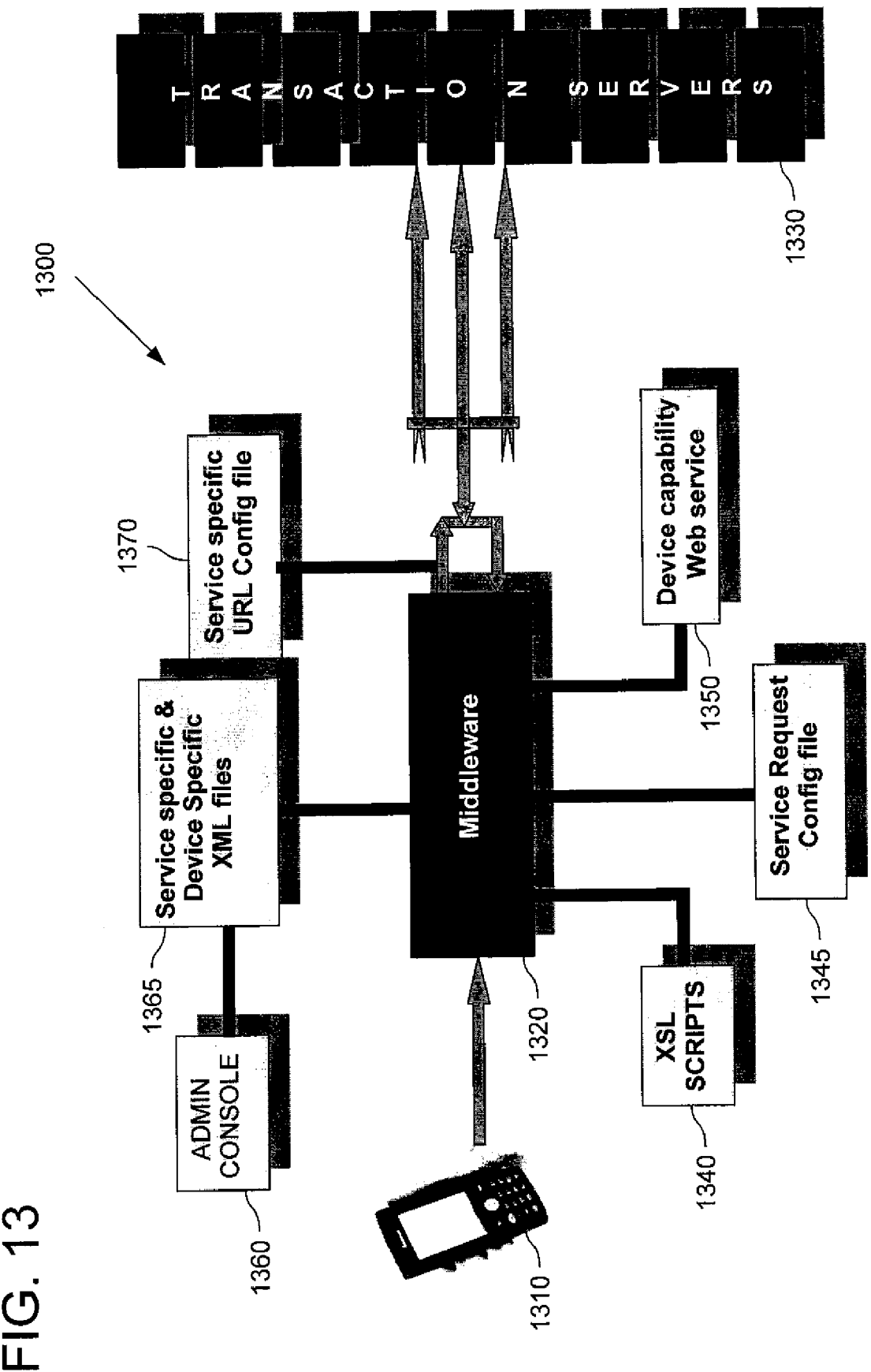
FIG. 13 is a high level architecture diagram of an exemplary system for implementing the technologies described herein.

FIG. 13 is a high level architecture diagram of an exemplary system 1300 for implementing the technologies described herein. Content adaptation and trans-coding can be performed based on the identified device type of the client device 1310 and its device characteristics, which can be obtained from the device capability web service 1350. A platform and content independent XML language can be defined which can be used to define user interface.

The transformation and content rendering engines 1340 can apply device specific templates to generate the final content that can also be adapted to different channels (e.g., HTML, WML, proprietary formats, and the like). If desired, the content can be unique to the particular client device. A session management module can manage sessions during interactions between the client devices and middleware 1320. The middleware 1320 can also interact with one or more backend transaction servers 1330 as desired. The various configuration files 1365, 1370, 1345 shown in the architecture can be used for customizing the middleware to fit for any kind of application (e.g., mobile ecommerce applications).

The administration console 1360 can be used to modify the configuration files (e.g., service specific and device specific XML files 1365).

Example 51

Exemplary Implementation

System

Figure 14:
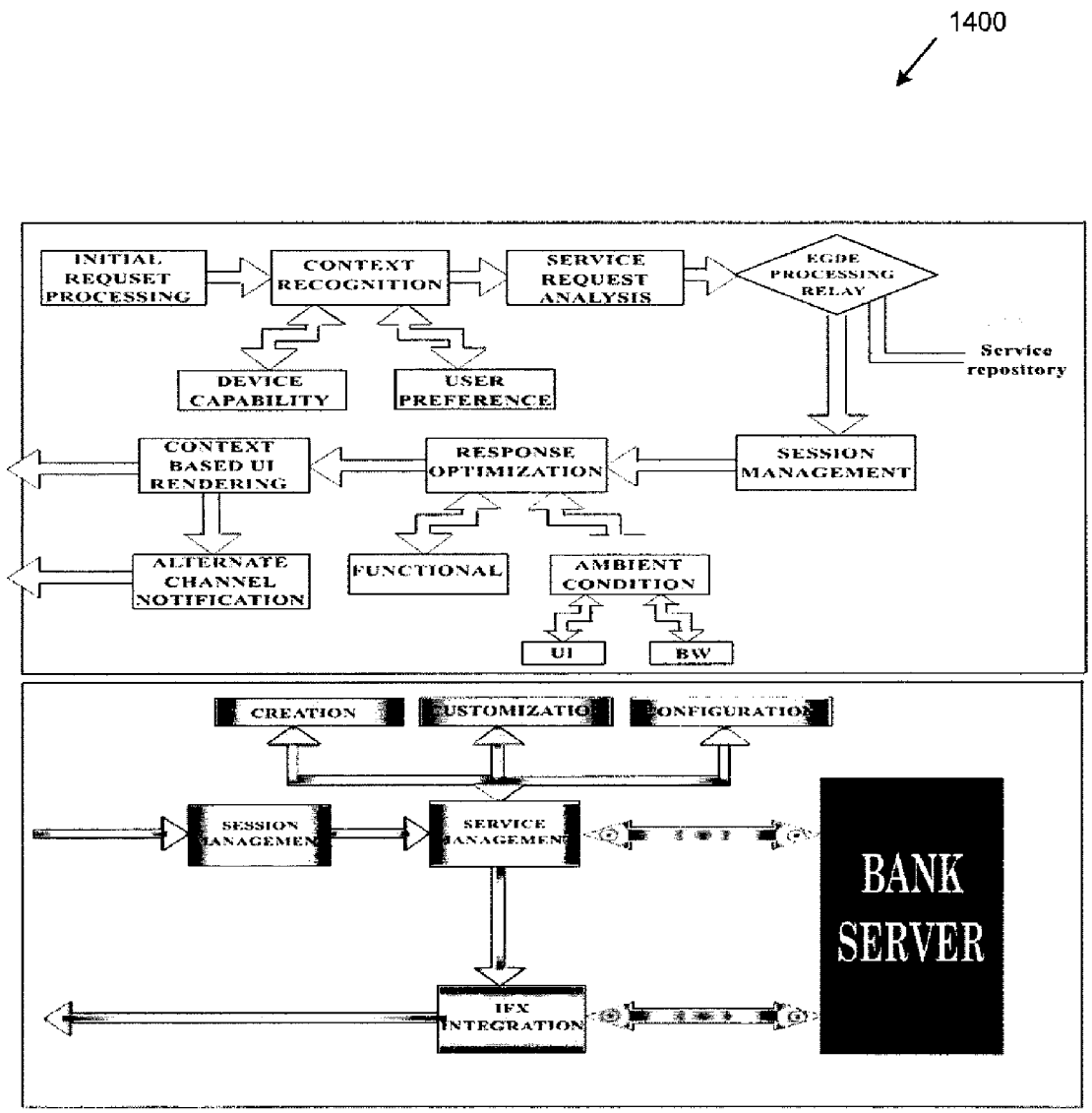
FIG. 14 is a block diagram of an exemplary system for implementing a middleware service as described herein.

FIG. 14 is a block diagram of an exemplary system 1400 for implementing a middleware service as described herein. In the example, the middleware service comprises the following modules: initial request processing, context recognition (e.g., with device capability and user preference submodules), service request analysis, edge processing relay, session management, response optimization (e.g., with functional and ambient conditions submodules—the ambient conditions submodule also having UI and BW (bandwidth) submodules), context-based UI rendering, and alternate channel notification modules.

A service repository is also shown.

The following modules are shown as possibly being on the backend side or in a connector: session management, service management (e.g., creation, customization, and configuration), and IFX integration. Although Interactive Financial Exchange (IFX) is shown because the example is for a bank server (communications between the middleware and the backend can be carried out in standard formats such as IFX), other applications can use other integration techniques.

Example 52

Exemplary User Interface Presentation

Figure 15:
FIG. 15 is a screen shot of an exemplary user interface presented by the technologies described herein.

FIG. 15 is a screen shot of an exemplary user interface 1500 presented by the technologies described herein and can serve as a transaction request user interface. The examples shows a login screen by which a user of the client device can provide username and password information. Subsequently, additional transactions can be carried out via the client device.

Figure 16:
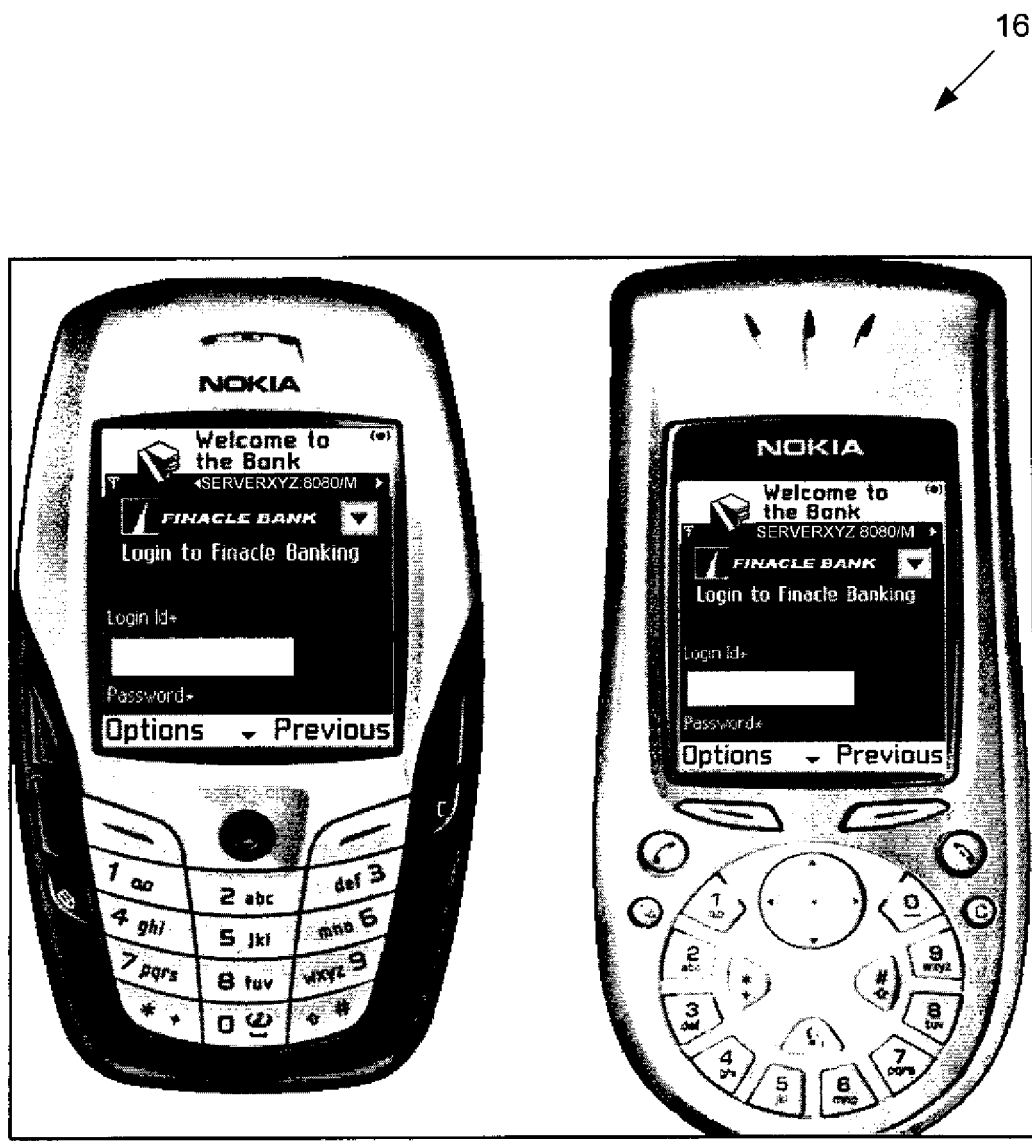
FIG. 16 includes screen shots of a user interface similar to that of FIG. 15, but presented on two different device types.

FIG. 16 includes screen shots 1600 of a user interface similar to that of FIG. 15, but presented on two different device types. For example, the same configuration information can be used to generate all three, but they are each tailored according to the context for the device.

Example 53

Exemplary Configuration Information for UI

FIG. 17 is exemplary configuration information 1700 for use in generating the user interface shown in FIG. 15. The configuration information 1700 is an example of a transaction model in that it specifies the input parameters for a particular transaction type "Signon" (i.e., "SignonRq" indicates a signon request).

In the example, the information 1700 is XML that can be stored in a configuration repository of the middleware service described herein. The configuration information is client device agnostic (e.g., it can be used independent of the context for the client device).

As shown in the configuration information 1700, representations of user interface elements can be included, as well as help information (e.g., presented when a user selects a help option at the client device). In the example, a parameter named CustLoginID of type Text and a parameter named SignOnPswd of type Password are specified as required. Another parameter named AcctType of type option, with options Savings and Current is also specified, but not required.

The specification of input parameters can be used to build the transaction request user interface as shown in FIG. 15.

In the example, the information is stored as part of an XML document (e.g., "RequestXML"). Before sending to the client device, the XML can be tailored to the context for the client device as described herein.

Example 54

Exemplary User Interface for Denoting Status

Figure 18:
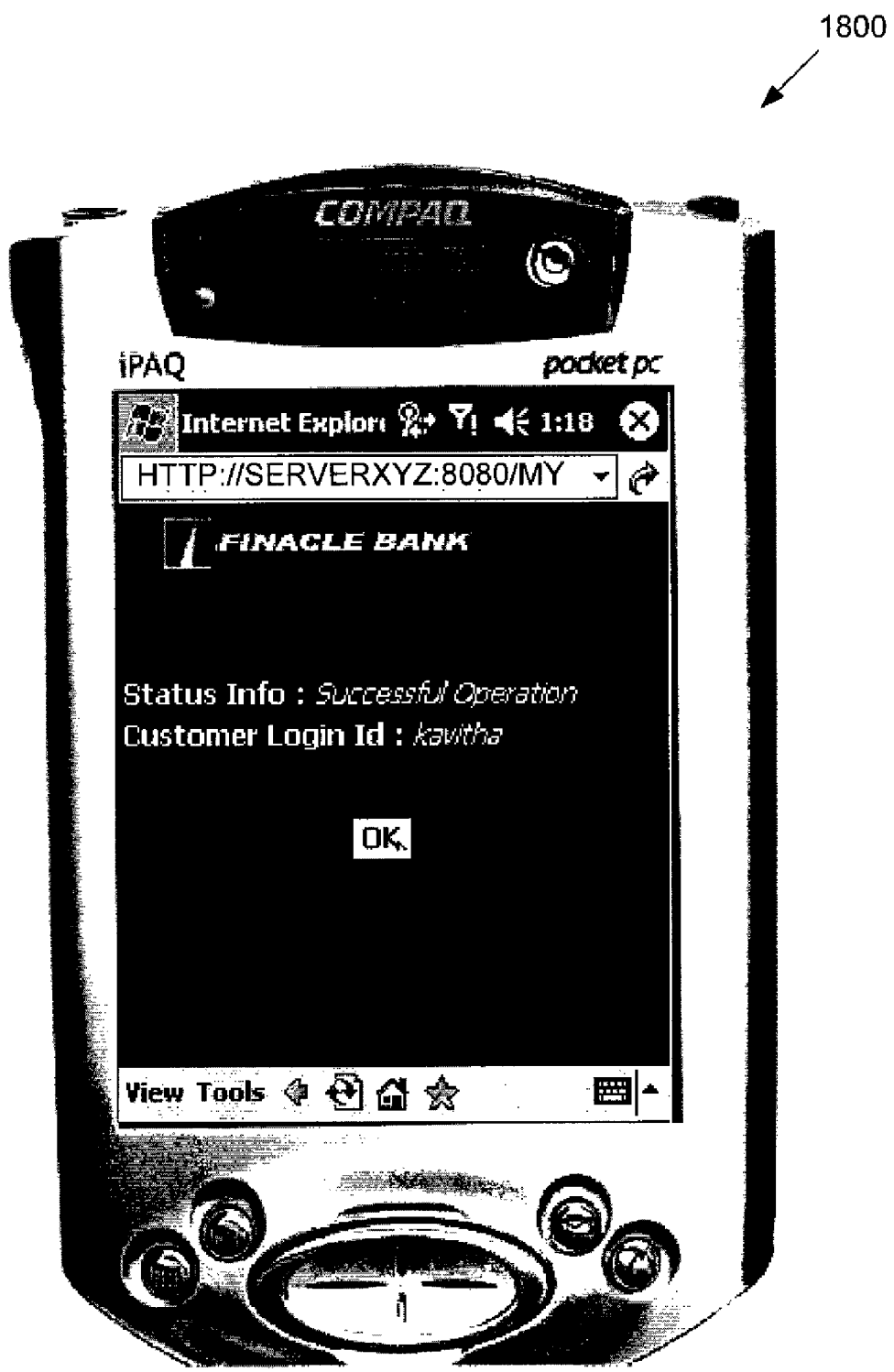
FIG. 18 is a screen shot of an exemplary user interface presented by the technologies described herein to denote status of an operation.

FIG. 18 is a screen shot of an exemplary user interface 1800 presented by the technologies described herein to denote status of an operation. For example, after a user logs in (e.g., via the user interface shown in FIG. 15), the user interface 1800 can be presented to let the user know the status. In the example, success is indicated. The "OK" button can be activated to proceed to perform further transactions (e.g., via a home page or the like).

Figure 19:
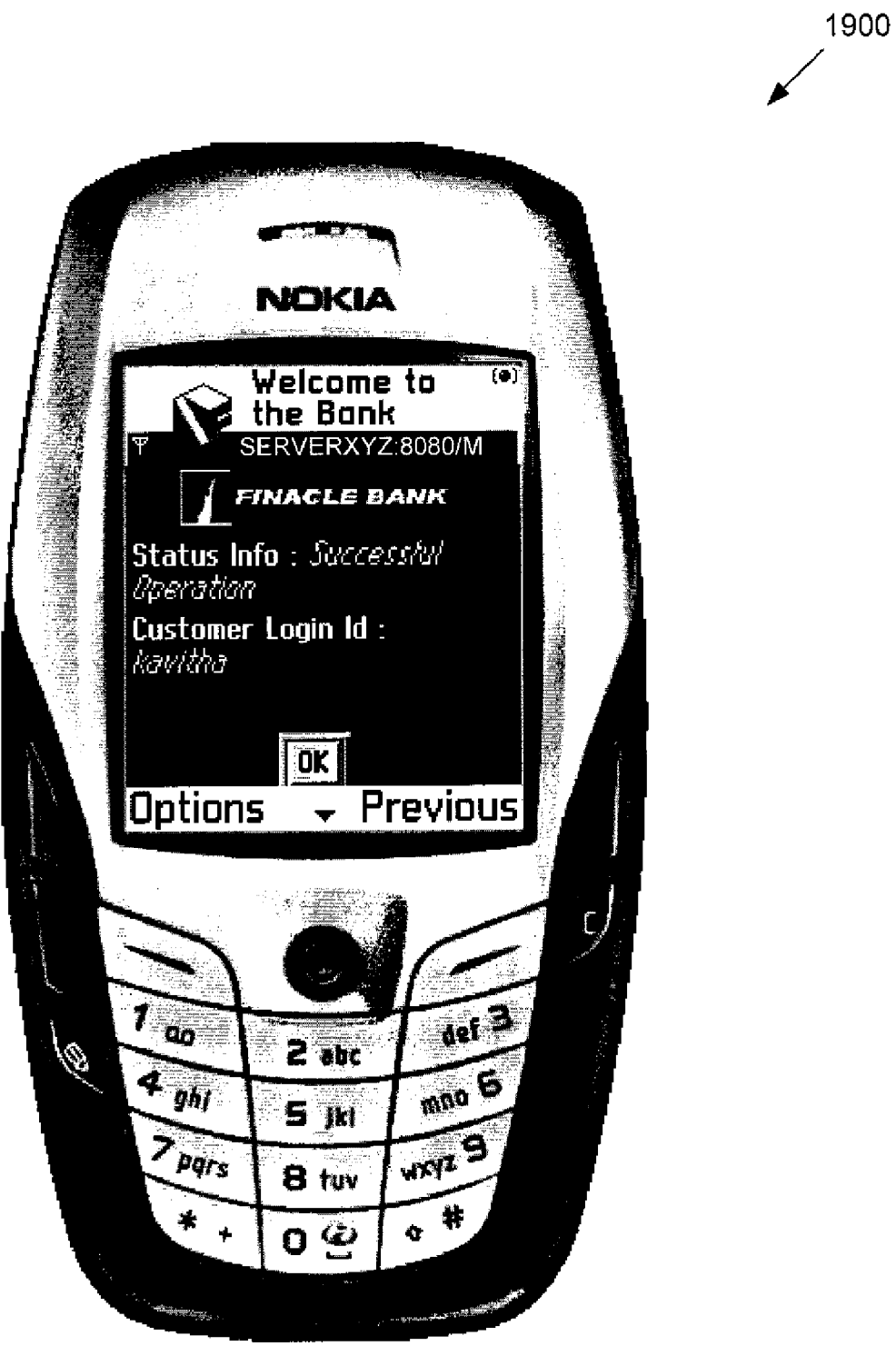
FIG. 19 is a screen shot of an exemplary user interface similar to that of FIG. 18, but presented on a different device type.

FIG. 19 is a screen shot 1900 of a user interface similar to that of FIG. 18, but presented on two different device types. For example, the same configuration information can be used to generate both, but they are each tailored according to the context for the device.

Example 55

Exemplary Response from Server

FIG. 20 is an exemplary response 2000 from a backend transaction server in response to a request, such as that generated via the user interface of FIG. 15, and can be used to generate the user interface of FIG. 18. In the example, a session key is also included. The session key can be stored as part of the session information for the communications session and used for subsequent communications with the backend server.

Although not shown, the response 2000 can be based on a part of the transaction model (e.g., in the form of an XML schema) that indicates the output parameters for the transaction type "SignOn" (e.g., SignOnRs indicates a sign on response). The output parameters can include any of a variety of parameters of various parameter types. The example includes StatusCode (e.g., a status of the transaction, such as whether it was successful or not), SignOnRole (e.g., Sign On Role), CustLoginId (i.e., Customer Login Identifier), and SessKey (i.e., session key).

Parameters can be received from the backend transaction server in any arbitrary format and mapped via a connector to the form specified by the XML schema to result in the XML as shown. Further processing (e.g., a template) can be used to include logos, look and feel, and the like. The resulting user interface presentation can be tailored to the client device based on the client device context.

In the example, the information is called "Response XML."

Example 56

Exemplary Specification of Output Parameters

Part of a transaction model can include a specification of the output parameters for the transaction type. The specification (e.g., a schema) can include a name of the parameter and a parameter type. When parameters are provided by the backend server, they can be placed into a format (e.g., XML) as defined by the schema. The middleware can then provide a tailored response based on the format defined by the schema.

The schema can support multiple records (e.g., rows in a table). So, for example, a row can be designated as having a date, amount, and the like.

In one implementation, supported response types include a simple, complex, and mixed responses. A simple type is when tag elements occur only once and there are no children to the tags. A complex type is when there is at least one child to the tags. A mixed type can have both complex and simple tags.

FIG. 21 shows an exemplary schema 2100 for output parameters comprising a login name and a login message. The example can be described as simple type.

FIG. 22 shows an exemplary schema 2200 for output parameters comprising a balance and then records, which can be a sequence of records having login name, account id, and balance. The example can be described as a complex type.

FIG. 23 shows an exemplary schema 2300 for output parameters comprising a statement response, which includes a login name and records, which can be a sequence of records having account id, availed date, transaction amount, and description. The example can be described as a mixed type.

Example 57

Exemplary User Interface for Performing a Enquiry Request Transaction

Figure 24:
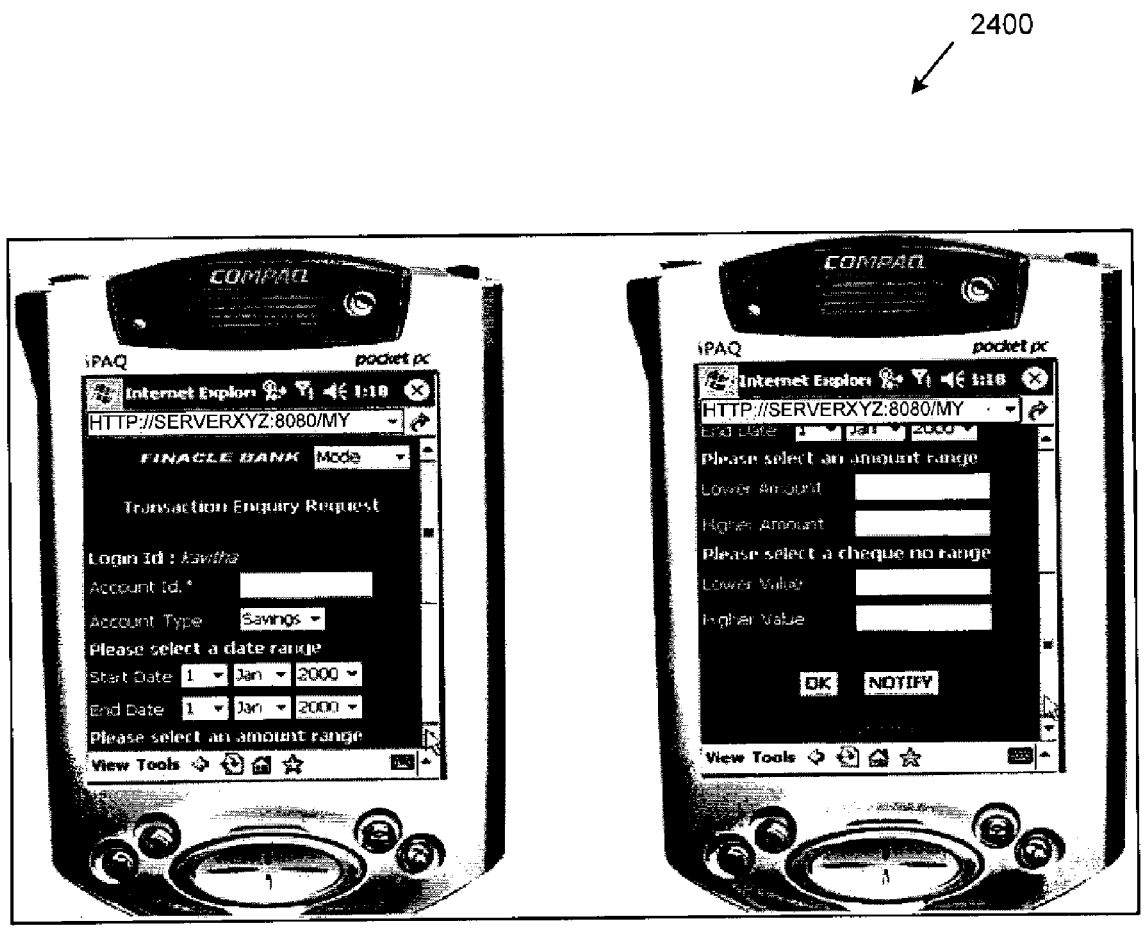
FIG. 24 is a screen shot of an exemplary user interface presented by the technologies described herein for performing a enquiry request transaction.

FIG. 24 is a screen shot of an exemplary user interface 2400 presented by the technologies described herein for performing an enquiry request transaction (e.g., a statement service for showing account transactions meeting the specified criteria). In the example, a user can specify an account identifier, an account type, a date range, an amount range, and a cheque number range.

An "OK" button sends a request to the middleware service, which relays it to the backend transaction server. The "notify" button can send notification via an alternate channel as described herein.

Example 58

Exemplary Configuration Information for UI

FIGS. 25 and 26 shows exemplary configuration information 2500 and 2600 for use in generating the user interface shown in FIG. 24. In the example, some of the data is of type "date." Therefore, the user interface presented for selecting a date can be tailored according to the context for the client device as described herein. The configuration information 2500 and 2600 is another example of a transaction in that it specifies the input parameters for a particular transaction type for Deposit Account Transaction Enquiry.

The configuration information 2500 and 2600 is client device agnostic (e.g., it can be used independent of the context for the client device).

Example 59

Exemplary User Interface in Response to Request

Figure 27:
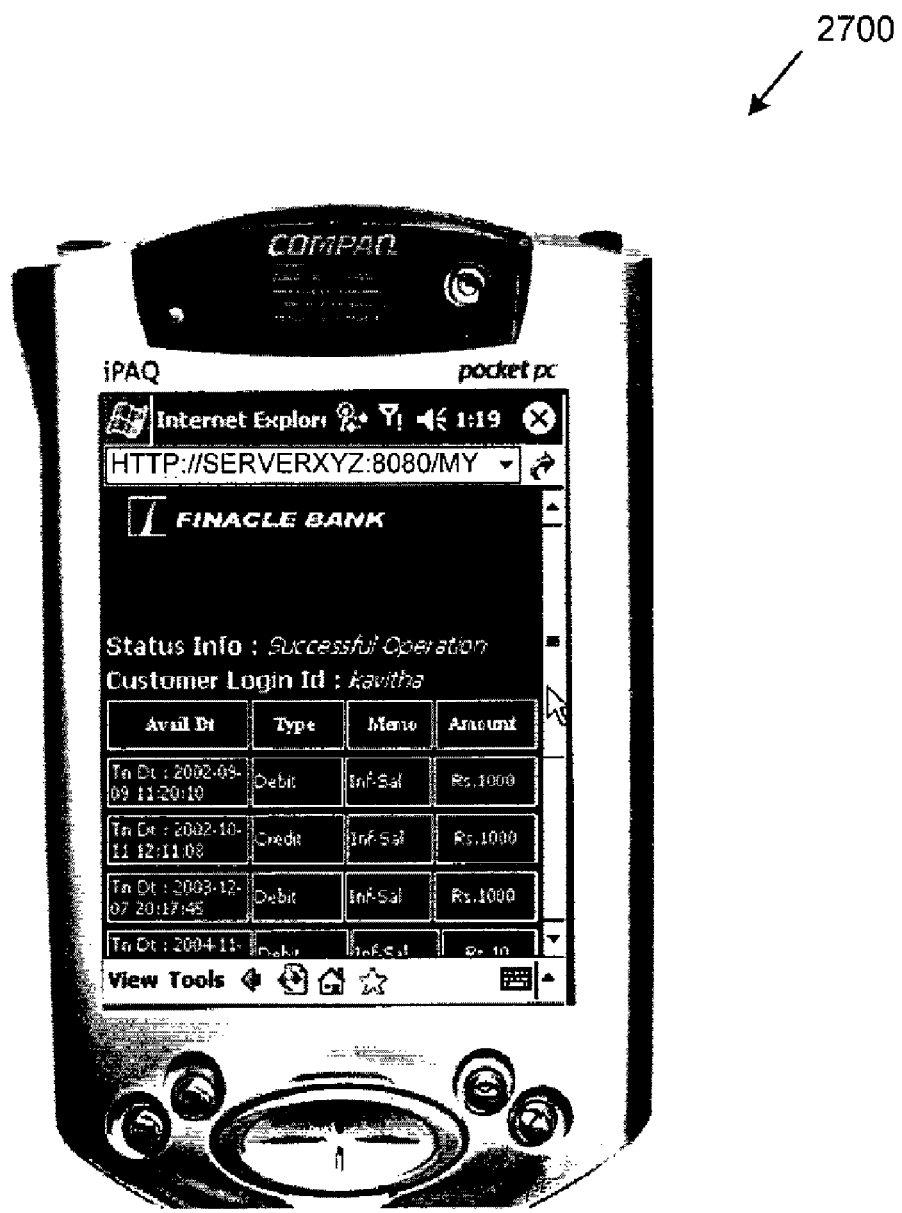
FIG. 27 is a screen shot of an exemplary user interface presented by the technologies described herein in response to a enquiry request transaction.

FIG. 27 is a screen shot of an exemplary user interface 2700 presented by the technologies described herein in response to an enquiry request transaction. The user interface 2700 shows those account transactions meeting the criteria specified (e.g., via the user interface shown in FIG. 24).

Figure 28:
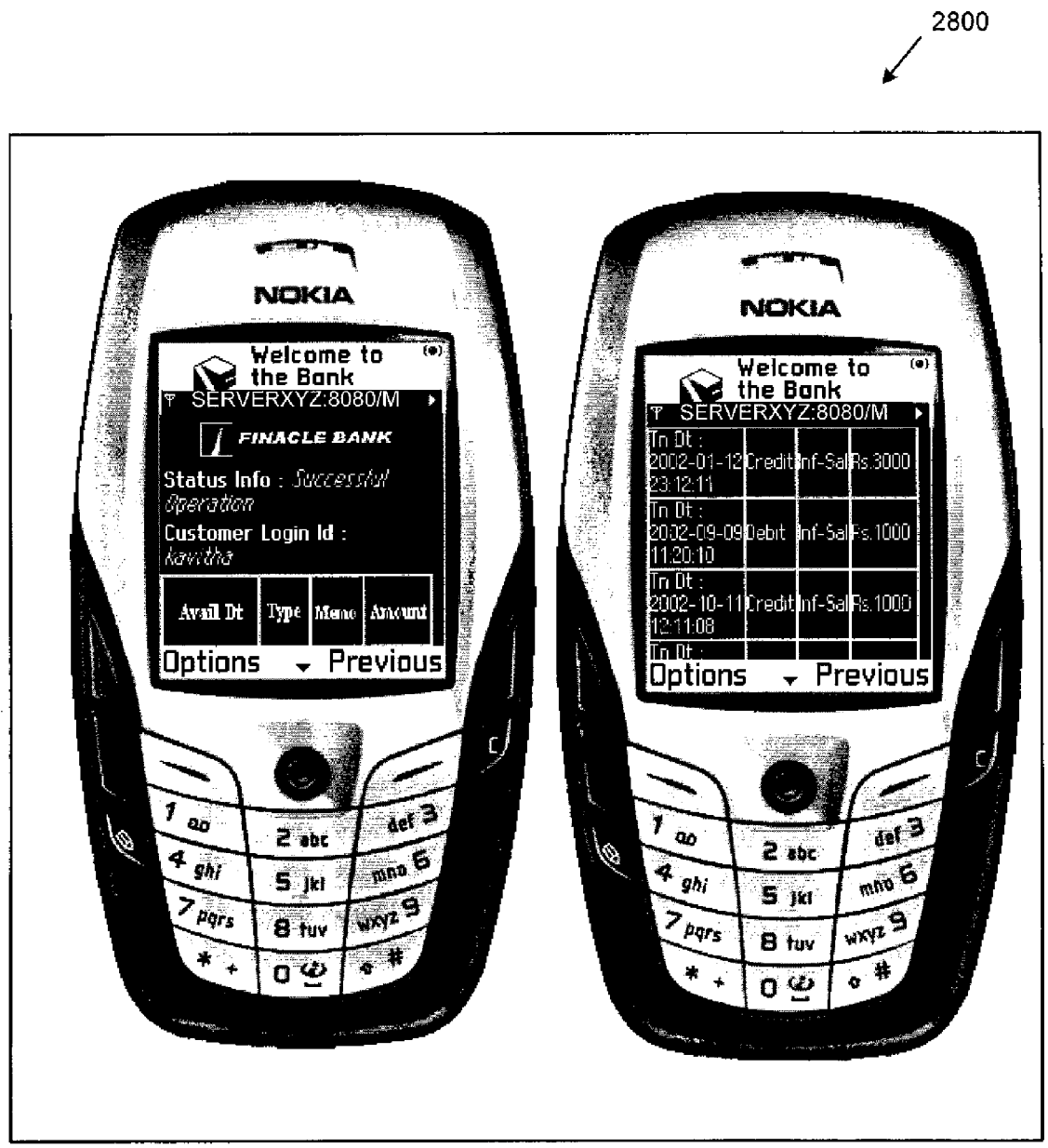
FIG. 28 is a screen shot of an exemplary user interface similar to that of FIG. 27, but presented on a different device type.

FIG. 28 is a screen shot 2800 of a user interface similar to that of FIG. 27, but presented on a different device type. For example, the same response from a server and configuration information can be used to generate both, but they are each tailored according to the context for the device.

Example 60

Exemplary Response from Server

FIG. 29 is exemplary response 2900 from a backend transaction server in response to a request, such as that generated via the user interface of FIG. 24, and can be used to generate the user interface of FIG. 27.

Although now shown, the response 2900 can be based on a part of the transaction model (e.g., in the form of an XML schema) that indicates the output parameters for the transaction type.

The example includes a plurality of records in a table under a table header.

Example 61

Exemplary Configuration Information for Transforming a Request

To achieve configuration of a service, the part of the transaction models specifying input parameters (e.g., request-XMLs) are placed into the middleware repository. Another part of the transaction model specifies how to transform the parameters to a format expected by the server. On submitting the request for a service, the URL to be called along with the parameters is specified for the transaction model (e.g., as part of a RequestConfig.xml file). An example RequestConfig.xml file is shown in FIG. 30.

FIG. 30 is exemplary configuration information 3000 for use in transforming a request from a client device into a format supported by a backend transaction server and can be a part of the transaction model that specifies how to transform a request with input parameters to a format supported by a backend transaction server. The example is for the login functionality (e.g., as shown in FIGS. 15 and 17). The configuration information 3000 can support parameter mapping and adding parameters to the request to the backend transaction server. The URL to be called for passing the parameters is also specified.

For example, the request from the client device can take the following form:

http://<hostname:port/
        mconnect.jsp?page=SignonRq&CustLoginID = <input
        fromuser>&SignOnPswd=<inputfromuser>&Acct
        Type=<userselection>

If so, transformation via the configuration information 3000 will result in the following request to the backend transaction server:

http://ServerXYZ:8080/AWS/
        AWSServlet?Action.CustInfo.Signon=Y&
        CorporateSignonCorpID=xxxxxxx&CorporateSignon
        Password=yyyyy Thus, the format (e.g., parameter names) of the request to the backend server can be changed without coding.

In the example, the server is not expecting the parameter "AcctType," so it is removed. In practice, the parameter can be removed from the request to the middleware.

Example 62

Exemplary Determination of Device Type Identifier

In any of the examples herein, a device type can be determined based on communications with the client device (e.g., via header information or the like).

Example 63

Exemplary Implementation

Table Column Truncation

Figure 31:
FIGS. 31, 32, 33, and 34 show an exemplary implementation of column truncation.
Figure 32:
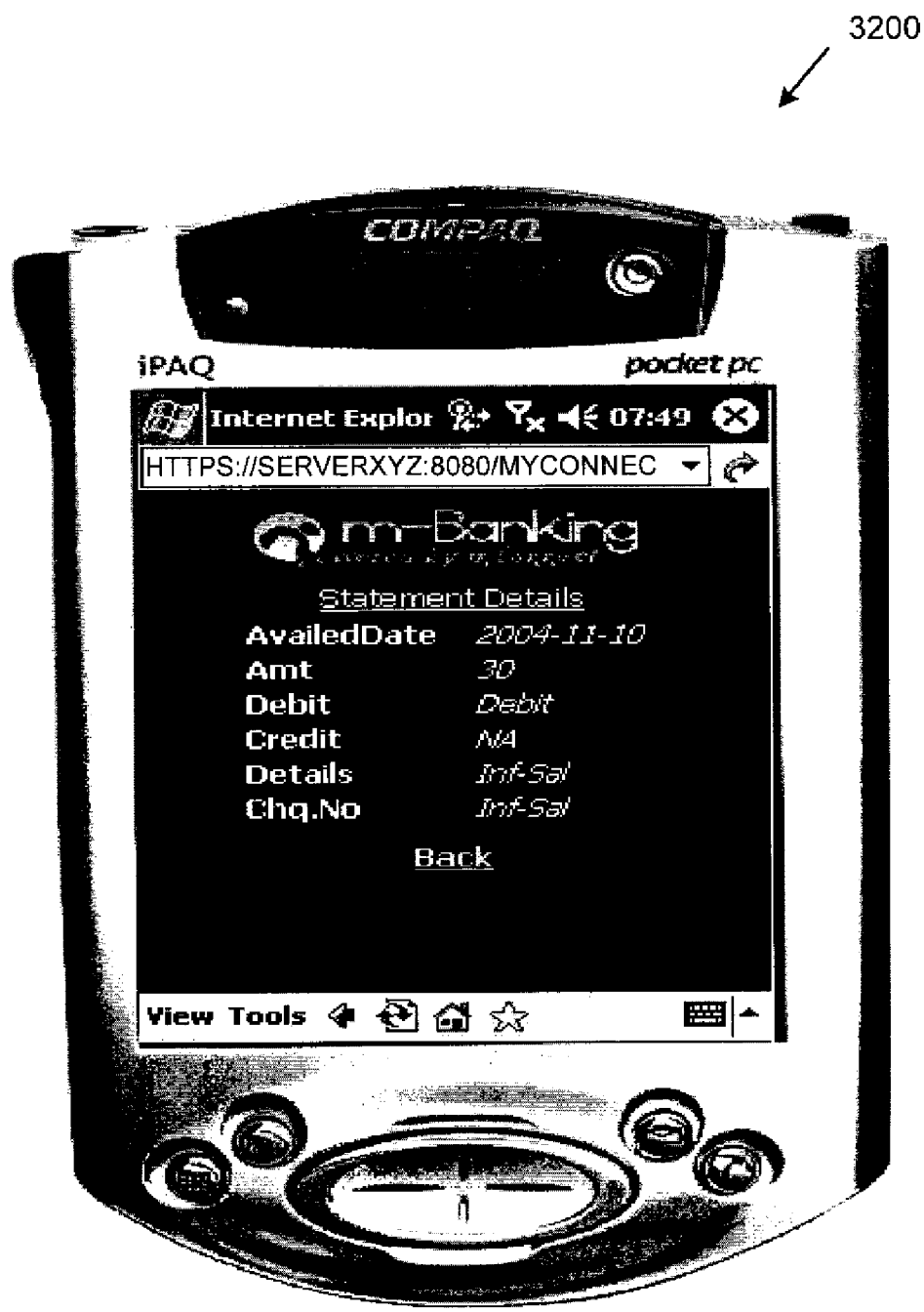
Figure 33:
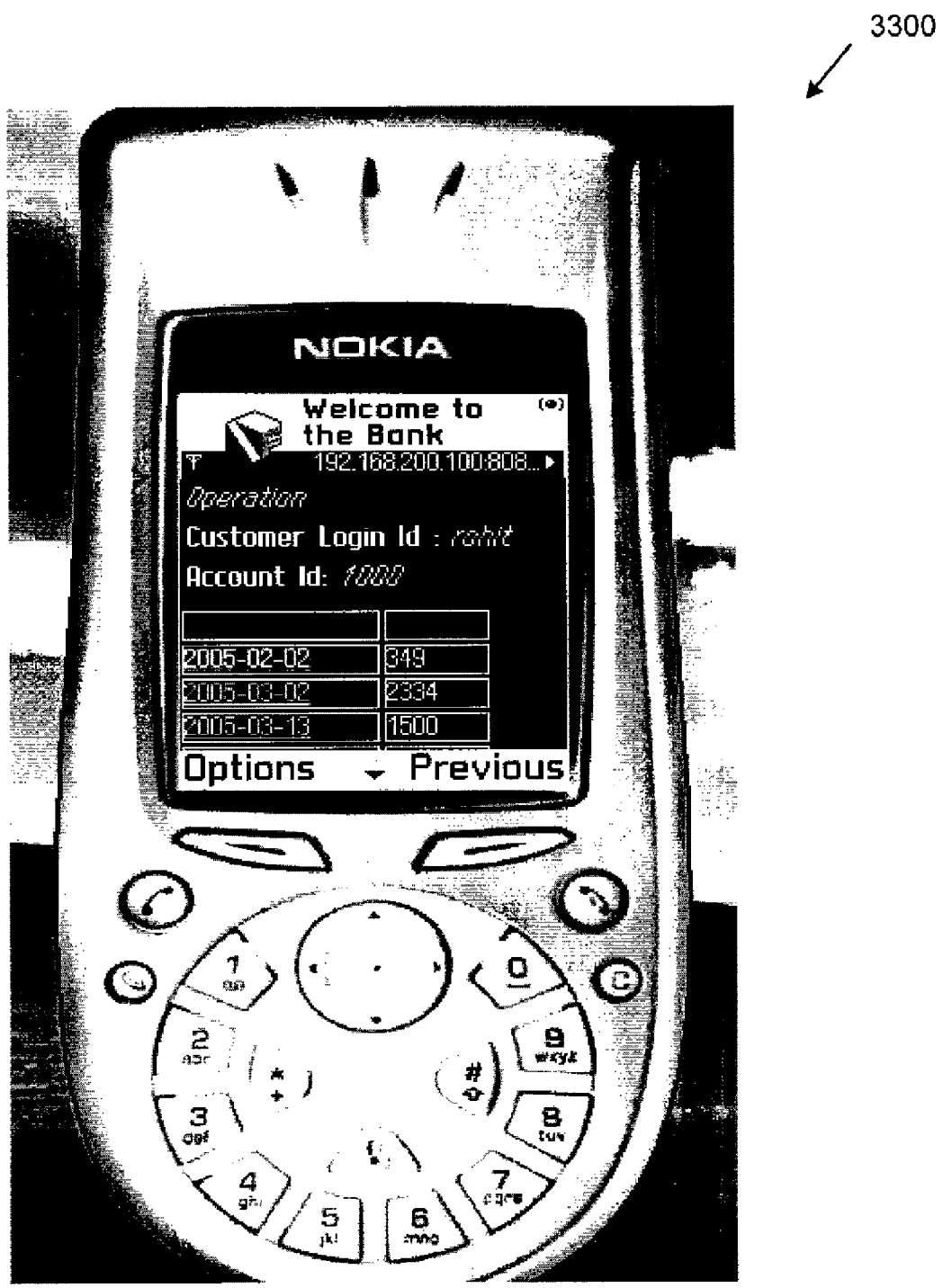
Figure 34:
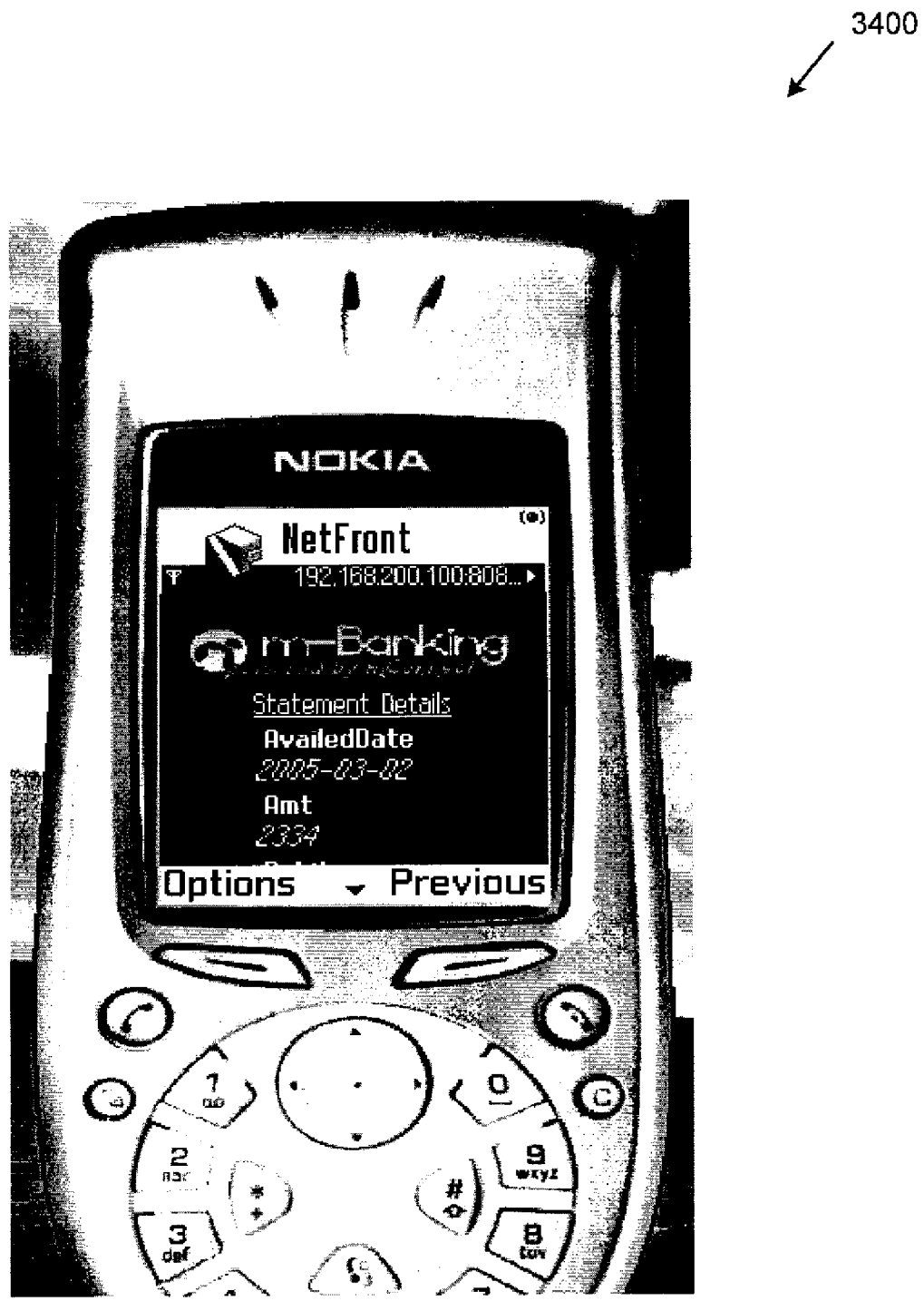

FIGS. 31, 32, 33, and 34 show an exemplary implementation of column truncation. FIGS. 31 and 32 show the feature as rendered on one device, and FIGS. 33 and 34 show the feature as rendered on another device.

In the example, a table has six columns: AvailedDate, Amt, Debit, Credit, Details, and Chq. No. After determining (e.g., during tailoring as described herein) that the last two columns should be truncated (e.g., due to limited screen real estate), a screen shot 3100 as shown in FIG. 31 results.

The first column has a hyperlink by which the user can navigate to the full values for the record. So, for example, FIG. 32 shows a screen shot 3200 after a user activates the second "2004-11-10", record. As shown in the example, the hyperlink need not have a unique display name. However, the link address can be unique with respect to the other links. As shown, values for the truncated columns (in the example, all columns) for the record are sent to the device for display. In the example, they all fit on the screen.

Similarly, for a different device, it may be determined (e.g., during tailoring as described herein) that the last four columns should be truncated (e.g., due to limited screen real estate). If so, a screen shot 3300 as shown in FIG. 33 results.

Again, the first column has a hyperlink by which the user can navigate to the full values for the record in which the hyperlink appears. So, for example, FIG. 34 shows a screen shot 3400 after a user activates the "2005-03-02" record. As shown, values for the truncated columns (in the example, all columns) for the respective record are sent to the device for display. Although they do not all fit on the screen, the user can scroll down to view them.

Renderings on different client device types can vary according to the context for the client device.

Example 64

Exemplary Home Pages for an Application

Figure 35:
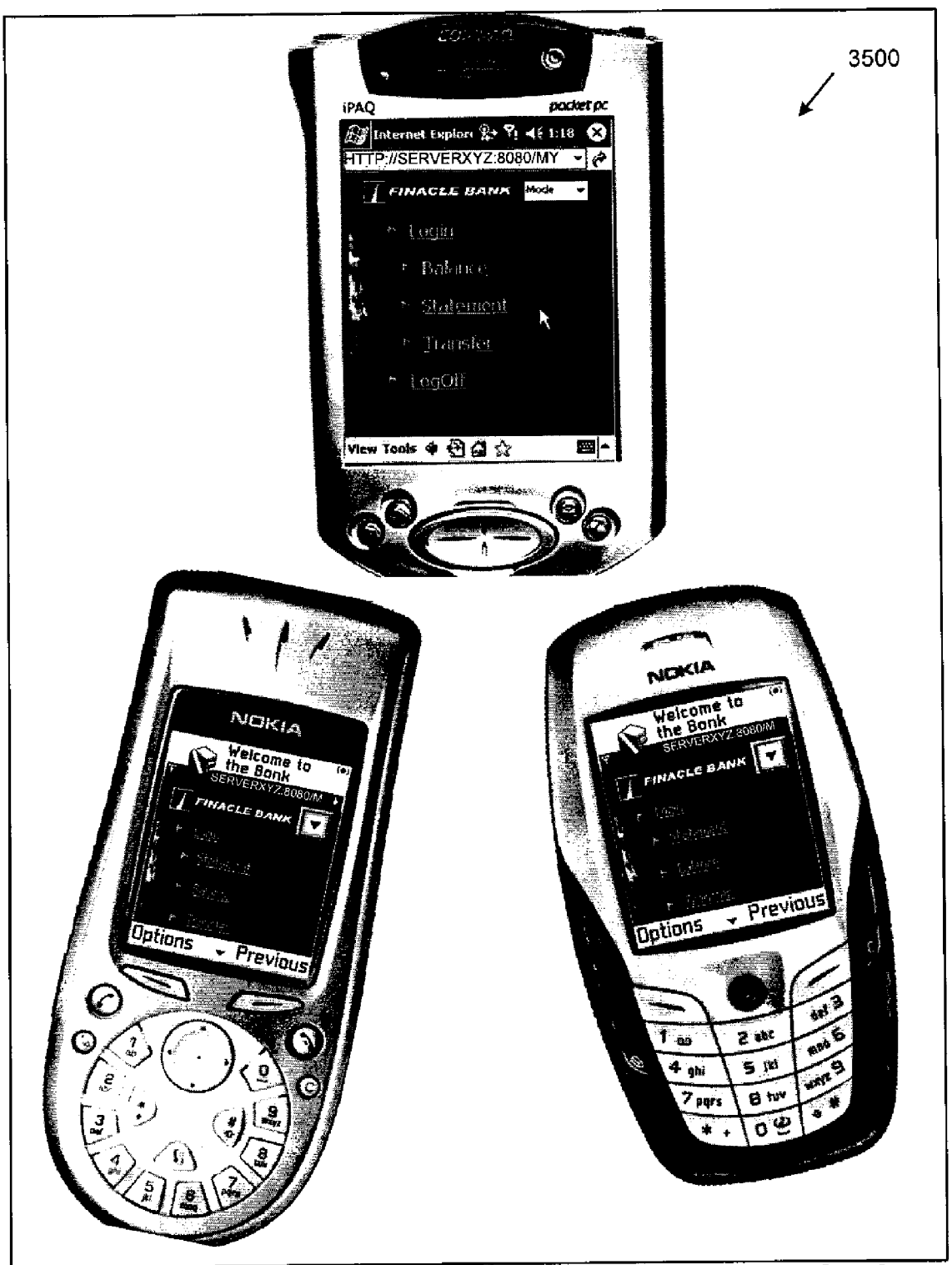
FIG. 35 shows exemplary screen shots of a home page for an application.

In any of the examples herein, a home page can be provided by which the user indicates the transaction type desired. FIG. 35 shows exemplary screen shots 3500 of a home page for an application (e.g., a banking application) rendered on three different devices via the technologies described herein.

In the example, activation of one of the user interface elements (e.g., a hyperlink) results in a request to the middleware for a transaction of the respective transaction type. A transaction request user interface (e.g., fillable form) is sent in response. The user can then specify parameters (e.g., complete the form) and send a request for the transaction with the parameters indicated by the user.

In the example, a user interface element is also provided for selecting a bandwidth mode (e.g., high, medium, low as described herein). Depending on screen real estate, the element appears as a drop down box with the word "mode" or simply a drop down square from which the mode can be selected. In this way, the user can specify a bandwidth setting.

Figure 36:
FIG. 36 shows exemplary screen shots of a home page for another application.

FIG. 36 shows exemplary screen shots 3600 of a home page for another application as rendered on three different devices via the technologies described herein.

Example 65

Exemplary Screenshots of Application

Figure 37:
FIGS. 37, 38, and 39 show exemplary screen shots of an application related to business intelligence.
Figure 38:
Figure 39:
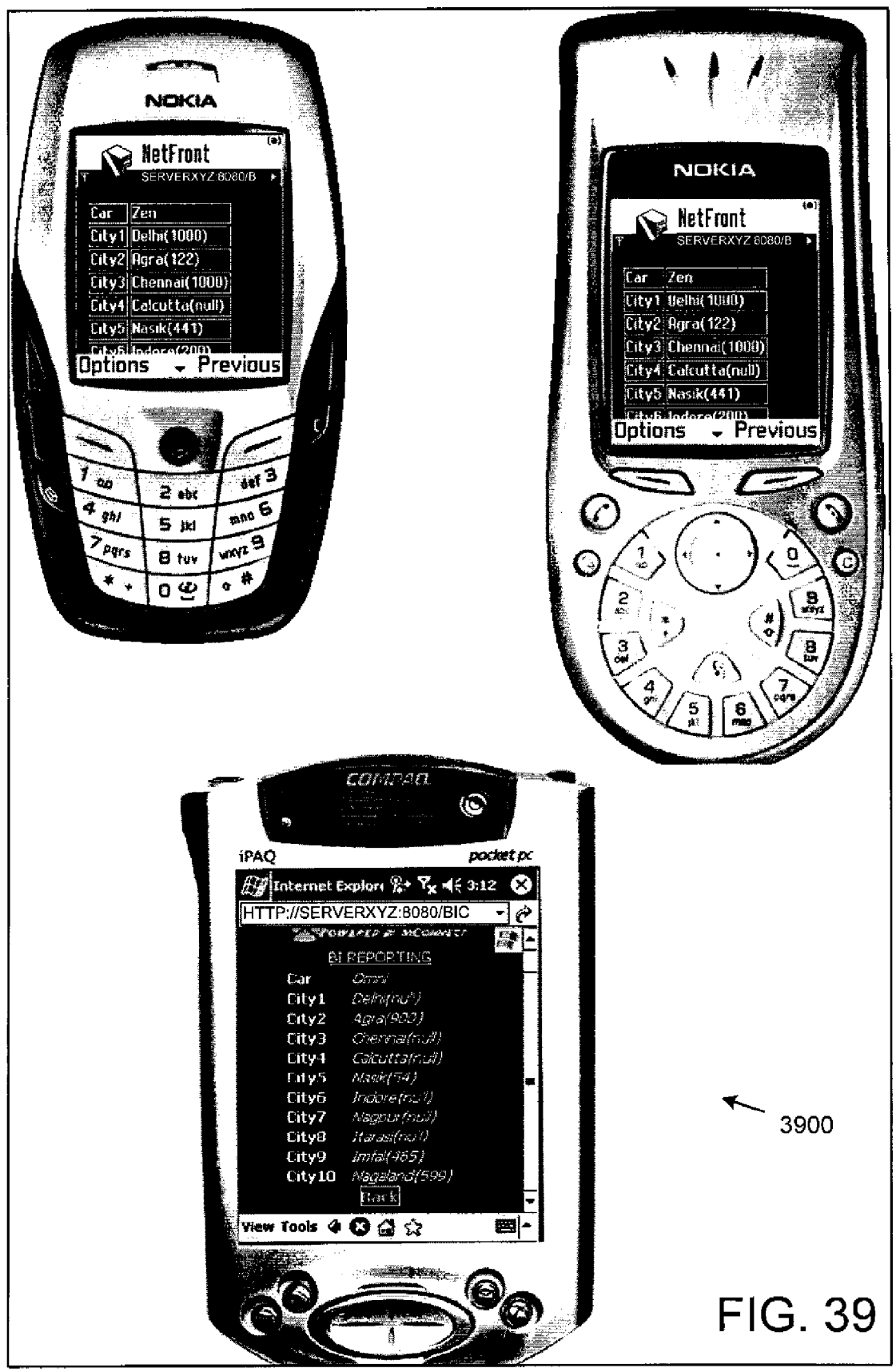

FIGS. 37, 38, and 39 shows exemplary screen shots of an application related to business intelligence on three different device types.

FIG. 37 shows a transaction request user interface (e.g., fillable form) 3700 by which a user can request a report (e.g., initiated by selecting the "GetReport" option of FIG. 36.

FIG. 38 shows results 3800 of having requested a report (i.e., the report is shown). Some of the columns are truncated via the smart fit feature. Also, tables have been sent to the client devices in a table structure chosen based on the context (e.g., user interface capabilities of the device). So, tables appear differently on different devices.

FIG. 39 shows results 3900 of having selected one of the records (e.g., Zen or Omi) in the results 3800 of FIG. 38 to display all columns for a record.

Example 66

Exemplary User Interface Element Representations

In any of the examples herein, user interface elements can be included as part of the specification of input parameters for a modeled transaction (e.g., in the request pages). The type of parameter can specify the user interface element.

Example 67

Exemplary User Interface Element Representation

Text

Table 1 shows a schema for an exemplary representation of a text user interface element, which can be specified as an input parameter for a transaction. The tag names shown are exemplary and may be changed as desired.

TABLE 1

| Text |
|---|
| <xxxxxxx> <Type>Text</Type> <Title>yyyy</Title> <Size>8</Size> <Rqd>True</Rqd> </xxxxxxx> |

The xxxxxxx will be the name assigned to the textbox and can be anything as specified by the developer (e.g., system user). The yyyy will be the Title for the text box field when displayed. The <Size> tag specifies the maximum entry length that is possible for that text box. The <Rqd> tag if 'True' specifies that this a mandatory field meaning without providing input to this field the transaction cannot be requested (e.g., the particular page can not be submitted).

Example 68

Exemplary User Interface Element Representation

Number

Table 2 shows a schema for an exemplary representation of a number user interface element, which can be specified as an input parameter for a transaction. The tag names shown are exemplary and may be changed as desired.

TABLE 2

| Number |
|---|
| <xxxxxxx> <Type>Number</Type> <Title>yyyy</Title> <Size>8</Size> <Rqd>True</Rqd> </xxxxxxx> |

This is similar to the 'Text' element, except that the field is validated as being number only.

Example 69

Exemplary User Interface Element Representation

Password

Table 3 shows a schema for an exemplary representation of a password user interface element, which can be specified as an input parameter for a transaction. The tag names shown are exemplary and may be changed as desired.

TABLE 3

Password

```
<xxxxxxx>
    <Type>Password</Type>
    <Title>yyyy</Title>
    <Size>8</Size>
    <Rqd>True</Rqd>
</xxxxxxx>
```

This is similar to 'Text' element except that here whatever the user enters will be shown as password characters (e.g., "*").

Example 70

Exemplary User Interface Element Representation

NumberPassword

Table 4 shows a schema for an exemplary representation of a numberpassword user interface element, which can be specified as an input parameter for a transaction. The tag names shown are exemplary and may be changed as desired.

TABLE 4

NumberPassword

```
<xxxxxxx>
    <Type>NumberPassword</Type>
    <Title>yyyy</Title>
    <Size>8</Size>
    <Rqd>True</Rqd>
</xxxxxxx>
```

This is similar to the 'Text' element, except that whatever the user enters will be shown as password characters. The user is restricted to entering only numbers.

Example 71

Exemplary User Interface Element Representation

Radio Button

Table 5 shows a schema for an exemplary representation of a radio button user interface element, which can be specified as an input parameter for a transaction. The tag names shown are exemplary and may be changed as desired.

TABLE 5

Radio Button

```
<XXXXX>
    <Type>RadioButton</Type>
    <Title>yyyyy</Title>
    <Options>
        <Option>value1</Option>
        <Option>value2</Option>
    </Options>
    <Exclusive>True</Exclusive>
</XXXXX>
```

The XXXXX will be the parameter name used to carry the chosen radio button value to the server (e.g., via the middleware). The yyyyy will be the title displayed for the group of radio buttons on the client device screen. The 'value1' and 'value2' are the display names of the radio buttons. The values to be sent to the server for the buttons can be different from their display names. If so, they can be specified.

Example 72

Exemplary User Interface Element Representation

Option (Dropdown)

Table 6 shows a schema for an exemplary representation of an option (dropdown) user interface element, which can be specified as an input parameter for a transaction. The tag names shown are exemplary and may be changed as desired.

TABLE 6

Option (Dropdown)

```
<XXXXX>
    <Type>Option</Type>
    <Title>yyyyy</Title>
    <Options>
        <Option>value1</Option>
        <Option>value2</Option>
    </Options>
    <Exclusive>True</Exclusive>
</XXXXX>
```

The XXXXX will be the parameter name used to carry the chosen option value from the dropdown to the server (e.g., via the middleware). The yyyyy will be the label name that will be displayed for the dropdown on the client device screen. The 'value1' and 'value2' are the display values of options in the dropdown. The values to be sent to the server for the options can be different from their display values/names. If so, they can be specified.

Example 73

Exemplary User Interface Element Representation

Checkbox

Table 7 shows a schema for an exemplary representation of a checkbox user interface element, which can be specified as an input parameter for a transaction. The tag names shown are exemplary and may be changed as desired.

TABLE 7

Checkbox

```
<XXXXX>
    <Type>CheckBox</Type>
    <Title>yyyyy</Title>
    <Options>
        <Option>value1</Option>
        <Option>value2</Option>
    </Options>
    <Exclusive>True</Exclusive>
</XXXXX>
```

The XXXXX will be the parameter name used to carry the chosen checkbox value to the server (e.g., via the middleware). The yyyyy will be the title that will be displayed for the group of checkboxes on the client device screen. The 'value1' and 'value2' are the display names of the checkboxes. The values to be sent to the server for the checkboxes can be different from their display names. If so, they can be specified.

Example 74

Exemplary User Interface Element Representation

Text Area

Table 8 shows a schema for an exemplary representation of a text area user interface element, which can be specified as an input parameter for a transaction. The tag names shown are exemplary and may be changed as desired,

TABLE 8

Text Area

```
<xxxxxxx>
    <Type>TextArea</Type>
    <Title>yyyy</Title>
    <Size>40</Size>
    <Rqd>True</Rqd>
</xxxxxxx>
```

This is similar to 'Text' element except that here the user will be viewing a TextArea instead of a textbox.

Example 75

Exemplary User Interface Element Representation

Date

Table 9 shows a schema for an exemplary representation of a date user interface element, which can be specified as an input parameter for a transaction. The tag names shown are exemplary and may be changed as desired.

TABLE 9

Date

```
<xxxxxxx>
    <Type>Date</Type>
    <Title>yyyy</Title>
    <Rqd>False</Rqd>
</xxxxxxx>
```

This format is similar to 'Text' element. The xxxxxxxx will be the name given to the Date field. The yyyy will be the title assigned to that date field. The Rqd tag for specifying whether it is mandatory or non-mandatory.

Example 76

Exemplary User Interface Element Representation

Others

In any of the examples herein, schema for representations of other user interface elements can also be added by following the rules of the specification language (e.g., XML). For example, a hyperlink, image display, and the like can be implemented.

Example 77

Exemplary Implementation

Service Introduction

When introducing services into the system, the following actions can be performed:
1. Identifying the services and defining them in the XML format
2. Identifying the mandatory and non-mandatory fields and mentioning them accordingly
3. Formalizing the response format
4. Making corresponding changes in the configuration fie (e.g., specify the service URLs for services and the parameter names)
5. Placing the files into the configuration repository of the middleware service
6. Enabling the session module as specified
7. Using the administration console to configure the service list for the devices (e.g., if the vendor believes that only services x and y are allowed for mobile users and for PDA users, z should be included, the same can be configured).
8. Performing vendor customization. The vendor can customize the graphics (e.g., the UI id divided into multiple parts, some of which the vendor can customize look and feel) by making appropriate changes to the configuration files specially available for specifying the UI templates

Example 78

Exemplary Implementation

Execution

To process requests, the following actions can be executed:
1. Receive the request from the client device at the middleware
2. Analyzing the request to identify the capabilities of the requesting device
   2a. The communication channel can be analyzed to identify the quality of service (QoS) parameters.
   2b. The request header can be analyzed to identify the device capabilities (capabilities of frequently used devices are locally available, rarely used ones can be fetched from the device capabilities SOA).
   2c. The above information can be stored in the session of the corresponding users for future reference.
3. Analyzing the request for further processing
4. If the response for the request is locally available (e.g., within the middleware service), then it is fetched locally. Otherwise, it is obtained from the backend by sending the request to the backend server. The request can be sent in a format supported by the server (e.g., configurable without coding). Thus, integration can be performed more quickly without having to do coding.

5. The response from the server is formatted according to the device capabilities 5a. The content is rendered based on the device capabilities along with the user preference specific changes.

5b. Pagination is done according to the device screen's real estate.

5c. Oversized content to be displayed in table format is provided with pop up links which displays values for each column in the pop up screen without having to connect to the backend server again.

6. The response is also sent via an alternate channel if the user has so requested.

7. The response is optimized for bandwidth and other parameters before sending it to the client device.

Example 79

Exemplary Advantage

Heterogeneous Network

The technologies described herein can be used to advantage in a wireless communication network that can support different client device types with different resources and features.

Example 80

Exemplary Features and Advantages

The technologies herein can provide a mobile middleware platform aimed at managing mobile device diversity in an efficient manner. The platform can handle the multiplicity of form factors and access mechanisms on multiple devices to provide a context agnostic view to the backend transaction server. The middleware can provide a custom user interface on each hand held by properly identifying the device capabilities to access the services offered by the transaction server. The view provided to the server is independent of the device requesting the service, consequently making the server device/access agnostic.

The technologies can allow for different access mechanisms, client implementations, and content formats. Service provisioning and management can be simplified via the system administration utility.

The technologies can provide a secure, context-aware, real-time mobile, on-the-move transactions and abstract the complexities of the mobile world from an existing transaction infrastructure and seamlessly help in extending/creating an internet transaction solution to mobile users with minimal or no modifications to the backend.

Example 81

Exemplary Advantages

The technologies described herein can serve as middleware for client devices (e.g., thin client devices) that renders pages across various client devices (e.g., with browsers). Pages can be generated intelligently on-the-fly based on the requesting device's capabilities.

Example 82

Exemplary Advantages

Any legacy application can also be converted for use by mobile devices (e.g., mobilized) via the technologies described herein.

Ecommerce applications can be implemented as mcommerce (e.g., mobil-commerce) applications via the technologies described herein.

Applications to users out in the field can also be used to advantage. For example, employees can connect to a central database for accessing content.

The technologies described herein can also offer one or more of the following advantages:

1. Abstracting the device diversity from the backend solutions

2. No need to have multiple static device-specific versions because the system is dynamic, real-time, and context-aware, and can significantly enhance the user experience.

3. Ability to leverage existing IT infrastructure

4. User-specific customizations

5. Significantly reduces time between conceptualization of a mobile service to its implementation and deployment.

6. Usage of web app model and a device capability repository ensures that the solution can scale up with the increase in device diversity as well as load.

Example 83

Exemplary Methodology

To design a service, a developer can define desired specific transactions and interactions of a mobile user in abstract form and generate interfaces that provide access to such transactions in a neat, directly accessible form. For example, the form need not be in the form of a typical web page when the user navigates through complex web pages on a mobile device to select a transaction.

The solution can also selectively present or not present content based on the end user and the specific device being used for the transaction. The user can also customize interaction with the system depending on the need and criticality of a transaction.

Example 84

Exemplary Computing Environment

Figure 40:
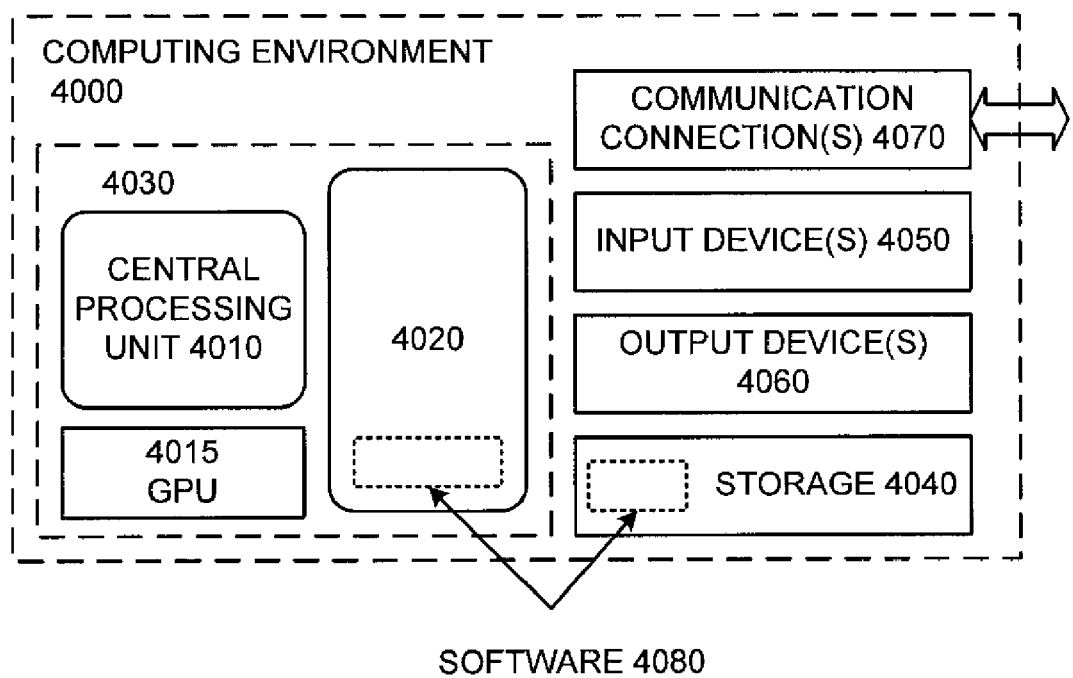
FIG. 40 is a block diagram of an exemplary suitable computing environment for implementing any of the technologies described herein.

FIG. 40 illustrates a generalized example of a suitable computing environment 4000 in which the described techniques can be implemented. The computing environment 4000 is not intended to suggest any limitation as to scope of use or functionality, as the technologies may be implemented in diverse general-purpose or special-purpose computing environments. A mainframe environment will be different from that shown, but can also implement the technologies and can also have computer-readable media, one or more processors, and the like.

With reference to FIG. 40, the computing environment 4000 includes at least one processing unit 4010 and memory 4020. In FIG. 40, this most basic configuration 4030 is included within a dashed line. The processing unit 4010 executes computer-executable instructions and may be a real or a virtual processor. In a multi-processing system, multiple processing units execute computer-executable instructions to increase processing power. The memory 4020 may be volatile memory (e.g., registers, cache, RAM), non-volatile memory (e.g., ROM, EEPROM, flash memory, etc.), or some combination of the two. The memory 4020 can store software 4080 implementing any of the technologies described herein.

A computing environment may have additional features. For example, the computing environment 4000 includes storage 4040, one or more input devices 4050, one or more output devices 4060, and one or more communication connections 4070. An interconnection mechanism (not shown) such as a bus, controller, or network interconnects the components of the computing environment 4000. Typically, operating system software (not shown) provides an operating environment for other software executing in the computing environment 4000, and coordinates activities of the components of the computing environment 4000.

The storage 4040 may be removable or non-removable, and includes magnetic disks, magnetic tapes or cassettes, CD-ROMs, CD-RWs, DVDs, or any other computer-readable media which can be used to store information and which can be accessed within the computing environment 4000. The storage 4040 can store software 4080 containing instructions for any of the technologies described herein.

The input device(s) 4050 may be a touch input device such as a keyboard, mouse, pen, or trackball, a voice input device, a scanning device, or another device that provides input to the computing environment 4000. For audio, the input device(s) 4050 may be a sound card or similar device that accepts audio input in analog or digital form, or a CD-ROM reader that provides audio samples to the computing environment. The output device(s) 4060 may be a display, printer, speaker, CD-writer, or another device that provides output from the computing environment 4000.

The communication connection(s) 4070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media or other tangible media).

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:
1. A computerized method comprising:
(A) receiving an indication of a transaction type from a client device;
(B) responsive to receiving the indication of the transaction type, based on a transaction model of the transaction type, sending information for rendering a transaction request user interface for the transaction type to the client device;
(C) receiving a request for transaction processing from the client device, wherein the request comprises one or more transaction parameters as submitted via a transaction form;
(D) at a middleware service configured to communicate with the client device, receiving an indication of a security protocol supported by the client device;
(E) transforming the request into a format supported by a backend transaction server, thereby generating a transformed request, wherein the transaction model of the transaction type specifies how to transform the one or more transaction parameters into the format supported by the backend transaction server, and wherein transforming the request comprises processing the request via the transaction model of the transaction type;
(F) sending the transformed request to the backend transaction server, wherein the transformed request comprises at least one of the one or more transaction parameters;
(G) receiving a response from the backend transaction server;
(H) in a computing environment comprising one or more processors and memory, tailoring the response received from the backend transaction server according to a stored context for the client device, thereby generating a tailored response, wherein the tailored response comprises user interface elements to be rendered as a user interface presentation on the client device, wherein the stored context comprises a user interface context for the client device, and the tailoring further comprises tailoring the response received from the backend transaction server according to the user interface context for the client device;
(I) sending the tailored response to the client device for rendering as a user interface presentation on the client device; and

(J) at the middleware service, responsive to receiving the indication of the security protocol supported by the client device, sending content to the client device via the security protocol;
(K) wherein tailoring the response according to a stored context for the client device comprises:
omitting display of one or more columns in the response;
placing at least one hyperlink in the response, wherein the at least one hyperlink is configured to display content from at least one of the omitted columns when activated; and
wherein the at least one hyperlink is superimposed on response data appearing in a displayed column.

2. One or more computer-readable storage media comprising computer-executable instructions causing a computer to perform a method comprising:
(A) receiving an indication of a transaction type from a client device;
(B) responsive to receiving the indication of the transaction type, based on a transaction model of the transaction type, sending information for rendering a transaction request user interface for the transaction type to the client device, wherein the transaction model of the transaction type is stored in a configuration repository;
(C) receiving a request for transaction processing from the client device, wherein the request comprises one or more transaction parameters as submitted via a transaction form;
(D) transforming the request into a format supported by a backend transaction server, thereby generating a transformed request, wherein the transaction model of the transaction type specifies how to transform the one or more transaction parameters into the format supported by the backend transaction server, wherein transforming the request comprises processing the request via the transaction model of the transaction type stored in the configuration repository, and wherein the transaction model represents a transaction via device-independent configuration information;
(E) sending the transformed request to the backend transaction server, wherein the transformed request comprises at least one of the one or more transaction parameters;
(F) receiving a response from the backend transaction server;
(G) tailoring the response received from the backend transaction server according to a stored context for the client device, thereby generating a tailored response, wherein the tailored response comprises user interface elements to be rendered as a user interface presentation on the client device, wherein the stored context comprises a user interface context for the client device, and the tailoring further comprises tailoring the response received from the backend transaction server according to the user interface context for the client device;
(H) sending the tailored response to the client device for rendering as a user interface presentation on the client device;
(I) at a middleware service configured to communicate with the client device, receiving an indication of a security protocol supported by the client device; and
(J) at the middleware service, responsive to receiving the indication of the security protocol supported by the client device, sending content to the client device via the security protocol;
(K) wherein tailoring the response according to a stored context for the client device comprises:
omitting display of one or more columns in the response;
placing at least one hyperlink in the response, wherein the at least one hyperlink is configured to display content from at least one of the omitted columns when activated; and
wherein the at least one hyperlink is superimposed on response data appearing in a displayed column.

3. The method of claim 1 further comprising:
logging an indication that a transaction of the transaction type was performed.

4. The method of claim 1 wherein:
transforming the request comprises adding a uniform resource locator indicated by the transaction model to the transformed request.

5. The method of claim 1 wherein the transaction model comprises one or more definitions of one or more respective transaction input parameters for transactions of the transaction type.

6. The method of claim 5 wherein at least one of the definitions indicates whether at least one of the parameters is required for transactions of the transaction type.

7. The method of claim 6 further comprising:
via the context for the client device, determining that a compact display mode is to be used; and
formatting the information for rendering the transaction request user interface for the compact display mode, wherein the formatting comprises omitting parameters indicated as not required.

8. The method of claim 1 wherein sending the information for rendering the transaction request user interface comprises:
tailoring the information for rendering the transaction request user interface according to a context for the client device, thereby generating tailored information for rendering the transaction request user interface, wherein the tailored information for rendering the transaction request user interface comprises user interface elements to be rendered as a user interface presentation on the client device; and
sending the tailored information for rendering the transaction request user interface to the client device for rendering as a user interface presentation on the client device.

9. The method of claim 8 wherein tailoring the information for rendering the transaction request user interface comprises:
selecting a user interface mechanism for receiving a date parameter according to the context for the client device.

10. The method of claim 9 wherein the user interface mechanism for receiving the date parameter is selected from the group consisting of:
a popup user interface element;
a dropdown user interface element; and
a text user interface element.

11. The method of claim 8 wherein tailoring the information for rendering the transaction request user interface comprises:
determining that at least one of the transaction parameters is not required; and
omitting a user interface mechanism for obtaining the at least one of the transaction parameters from the tailored information for rendering the transaction request user interface.

12. The method of claim 1 wherein sending the information for rendering the transaction request user interface for the transaction type to the client device is performed via the transaction model without communicating with the backend transaction server.

13. The method of claim 1 further comprising:
determining a device type name of the client device via communication with the client device;
retrieving device capabilities for the client device from a configuration repository via the device type name; and
integrating the device capabilities into the context.

14. The method of claim 1 wherein:
the context comprises device capabilities for the client device; and
the device capabilities are retrieved via a service oriented architecture model.

15. The method of claim 1 wherein:
the context comprises device capabilities for the client device; and
the device capabilities are retrieved from a web service.

16. The method of claim 1 further comprising:
at a middleware service configured to communicate with the client device, receiving an indication of an ambient conditions setting;
at the middleware service, responsive to receiving the indication of the ambient conditions setting, tailoring user interface presentations for the client device to colors associated with the ambient conditions setting.

17. A computerized method comprising:
(A) receiving a first request from a client device, wherein the first request comprises an indication of a transaction type;
(B) responsive to receiving the first request, sending a first response to the client device, wherein the first response comprises information for rendering a transaction request user interface generated via a transaction model of the transaction type, wherein the transaction model of the transaction type is stored in a configuration repository;
(C) receiving a second request from the client device, wherein the second request specifies one or more transaction parameters for completing a transaction of the transaction type;
(D) via the transaction model of the transaction type, transforming the second request into a transformed request of a format accepted by a backend transaction server, wherein the transaction model of the transaction type specifies how to transform the one or more transaction parameters into the format accepted by the backend transaction server, wherein transforming the second request comprises processing the second request via the transaction model of the transaction type stored in the configuration repository, and wherein the transaction model represents a transaction via device-independent configuration information;
(E) sending the transformed request to the backend transaction server;
(F) receiving a response from the backend transaction server;
(G) in a computing environment comprising one or more processors and memory, constructing a second response to the client device based on the response received from the backend transaction server, wherein constructing the second response comprises tailoring the response received from the backend transaction server according to a stored context for the client device, wherein the stored context comprises a user interface context for the client device, and the tailoring further comprises tailoring the response received from the backend transaction server according to the user interface context for the client device;
(H) sending the second response to the client device;
(I) at a middleware service configured to communicate with the client device, receiving an indication of a security protocol supported by the client device; and
(J) at the middleware service, responsive to receiving the indication of the security protocol supported by the client device, sending content to the client device via the security protocol;
(K) wherein tailoring the response received from the backend transaction server according to a stored context for the client device further comprises:
omitting display of one or more columns in the response received from the backend transaction server;
placing at least one hyperlink in the response received from the backend transaction server, wherein the at least one hyperlink is configured to display content from at least one of the omitted columns when activated; and
wherein the at least one hyperlink is superimposed on response data appearing in a displayed column.

18. A machine comprising:
(A) a computing environment comprising at least one processing unit and memory;
(B) means for indicating a plurality of client device contexts, wherein the means for indicating a plurality of client device contexts comprises means for indicating a user interface context for a client device;
(C) means for storing a plurality of means for modeling transactions for respective transaction types;
(D) means for sending means for requesting a transaction to the client device, wherein the means for requesting is constructed via at least one of the means for modeling transactions;
(E) means for receiving a request for a transaction, wherein the request comprises a plurality of transaction parameters submitted via the means for requesting the transaction;
(F) means for relaying the request to a backend server in a format supported by the backend server; and
(G) means for presenting results at the client device in a format tailored to the client device based on the means for indicating the plurality of client device contexts and based at least on the means for indicating a user interface context for the client device;
(H) wherein at least one of the means for modeling transactions specifies how to transform the transaction parameters into the format supported by the backend transaction server, and wherein the at least one of the means for modeling transactions represents a transaction via device-independent configuration information; and
(I) wherein the means for indicating a plurality of client device contexts further comprises means for indicating a security protocol supported by the client device;
(J) wherein the means for presenting results at the client device in a format tailored to the client device comprises:
means for sending content to the client device via the security protocol;
means for omitting display of one or more columns in the results;

means for placing at least one hyperlink in the results, wherein the at least one hyperlink is configured to display content from at least one of the omitted columns when activated; and wherein the at least one hyperlink is superimposed on results data appearing in a displayed column.

19. A middleware service comprising:
(A) a client device capabilities repository stored in one or more computer-readable storage media and indicative of capabilities of a plurality of different client device types;
(B) a plurality of transaction models indicative of how to process communications for a plurality of transaction types, wherein the transaction models are stored in a configuration repository;
(C) a backend-directed tailoring engine operable to transform communications from a client device into a format desired by a backend transaction server based on information in the transaction models,
(D) wherein a transaction model of a given transaction type specifies how to transform one or more transaction parameters into the format desired by the backend transaction server, wherein transforming the communications comprises processing the communications via the transaction model of the given transaction type as stored in the configuration repository, and
(E) wherein the transaction model of the given transaction type represents a transaction via device-independent configuration information; and
(F) a client-directed tailoring engine operable to transform conununications to the client device into a format appropriate for capabilities of the client device based on a user interface context for the client device and according to information in the client device capabilities repository; and
(G) wherein the client-directed tailoring engine tailors communications received from the backend transaction server according to a stored context for the client device, thereby generating a tailored communication, wherein the tailored communication comprises user interface elements to be rendered as a user interface presentation on the client device,
(H) wherein the stored context comprises a user interface context for the client device, and the client-directed tailoring engine tailors the communications received from the backend transaction server according to the user interface context for the client device;
(I) wherein the client-directed tailoring engine transforms communications to the client device into a format appropriate for capabilities of the client device by sending content to the client device via a security protocol, based on a received indication of the security protocol supported by the client device;
(J) wherein the client-directed tailoring engine transforms communications to the client device into a format appropriate for capabilities of the client device by omitting display of one or more columns in the communications to the client device, and placing at least one hyperlink in the communications to the client device, wherein the at least one hyperlink is configured to display content from at least one of the omitted columns when activated; and
(K) wherein the at least one hyperlink is superimposed on communication data appearing in a displayed column.

20. The one or more computer-readable storage media of claim 2 wherein the computer-readable storage media have encoded thereon a data structure comprising:
one or more definitions of one or more transaction input parameters for the transaction of the transaction type;
a uniform resource locator indicating the backend transaction server to which a request for processing the transaction of the transaction type can be submitted; and
a definition of one or more parameter mappings for presenting the transaction of the transaction type to the backend transaction server in the format supported by the backend transaction server;
wherein at least one of the definitions of the transaction input parameters comprises an indication of whether at least one of the transaction input parameters is mandatory.

21. A method of adding an application to a middleware service, the method comprising:
(A) in a computing environment comprising one or more processors and memory, creating a plurality of transaction models modeling respective transaction types of transactions for the application, wherein the transaction models define input parameters, response transformation, and output parameters for respective transactions;
(B) adding the transaction models to a configuration repository of the middleware service;
(C) customizing appearance of the application; and
(D) receiving an indication of a transaction type from a client device;
(E) responsive to receiving the indication of the transaction type, based on a transaction model of the transaction type, sending information for rendering a transaction request user interface for the transaction type to the client device;
(F) receiving a request for transaction processing from the client device, wherein the request comprises one or more transaction parameters as submitted via a transaction form;
(G) at a middleware service configured to communicate with the client device, receiving an indication of a security protocol supported by the client device;
(H) transforming the request into a format supported by a backend transaction server, thereby generating a transformed request, wherein the transaction model of the transaction type specifies how to transform the one or more transaction parameters into the format supported by the backend transaction server, and wherein transforming the request comprises processing the request via the transaction model of the transaction type;
(I) sending the transformed request to the backend transaction server, wherein the transformed request comprises at least one of the one or more transaction parameters;
(J) receiving a response from the backend transaction server;
(K) in a computing environment comprising one or more processors and memory, tailoring the response received from the backend transaction server according to a stored context for the client device, thereby generating a tailored response, wherein the tailored response comprises user interface elements to be rendered as a user interface presentation on the client device, wherein the stored context comprises a user interface context for the client device, and the tailoring further comprises tailoring the response received from the backend transaction server according to the user interface context for the client device;
(L) sending the tailored response to the client device for rendering as a user interface presentation on the client device; and (M) at the middleware service, responsive to receiving the indication of the security protocol supported by the client device, sending content to the client device via the security protocol;

(N) wherein tailoring the response according to a stored context for the client device comprises:

omitting display of one or more columns in the response;

placing at least one hyperlink in the response, wherein the at least one hyperlink is configured to display content from at least one of the omitted columns when activated; and wherein the at least one hyperlink is superimposed on response data appearing in a displayed column.

22. The method of claim 21 further comprising:
designating at least one of the transaction types as unavailable to one or more device types.

23. The method of claim 21 further comprising:
designating at least one of the transaction types as unavailable to one or more users.

24. The method of claim 21 wherein the transaction models comprise no executable code.

25. The method of claim 21 further comprising:
defining a compound transaction model as a combination of a plurality of the transaction models of different transaction types, wherein the compound transaction model incorporates at least one output parameter from one of the transaction models and at least one output parameter from another of the transaction models.

26. The method of claim 25 further comprising:
in the configuration repository of the middleware service, specifying a value for at least one input parameter for the transaction model, thereby specifying the at least one input parameter as an implied input parameter.

27. The method of claim 21 further comprising:
defining a compound transaction model as a combination of a plurality of the transaction models of different transaction types, wherein the compound transaction model incorporates at least one input parameter from one of the transaction models and at least one input parameter from another of the transaction models.

28. A method of tailoring a response to a client device, the method comprising:

(A) in a computing environment comprising one or more processors and memory, determining a context for the client device, wherein the context for the client device comprises an indication of capabilities of the client device, wherein the capabilities indicated by the context for the client device comprise a screen size of the device, a font size of the device, execution engines available at the device, markup languages supported by the device, a security protocol supported by the client device, and a browser type of the device;

(B) receiving an indication of a transaction type from the client device;

(C) responsive to receiving the indication of the transaction type, based on a transaction model of the transaction type, sending information for rendering a transaction request user interface for the transaction type to the client device;

(D) receiving a request for transaction processing from the client device, wherein the request comprises one or more transaction parameters as submitted via a transaction form;

(E) at a middleware service configured to communicate with the client device, receiving an indication of a security protocol supported by the client device;

(F) transforming the request into a format supported by a backend transaction server, thereby generating a transformed request, wherein the transaction model of the transaction type specifies how to transform the one or more transaction parameters into the format supported by the backend transaction server, and wherein transforming the request comprises processing the request via the transaction model of the transaction type;

(G) sending the transformed request to the backend transaction server, wherein the transformed request comprises at least one of the one or more transaction parameters;

(H) receiving a response from the backend transaction server;

(I) in the computing environment, tailoring the response received from the backend transaction server according to the context for the client device, thereby generating a tailored response, wherein the tailored response comprises user interface elements to be rendered as a user interface presentation on the client device, wherein the context comprises a user interface context for the client device, and the tailoring further comprises tailoring the response received from the backend transaction server according to the user interface context for the client device;

(J) sending the tailored response to the client device for rendering as a user interface presentation on the client device; and (K) at the middleware service, responsive to receiving the indication of the security protocol supported by the client device, sending content to the client device via the security protocol;

(L) wherein tailoring the response according to a context for the client device comprises:

omitting display of one or more columns in the response;

placing at least one hyperlink in the response, wherein the at least one hyperlink is configured to display content from at least one of the omitted columns when activated; and wherein the at least one hyperlink is superimposed on response data appearing in a displayed column; and (M) based on the context, for the response to the client device, tailoring one or more out of the group consisting of the following:

structure of a table sent in the response to the client device;

a scroll bar sent in the response to the client device;

a type of user interface element sent in the response to the client device;

whether a mechanism for obtaining a non-mandatory parameter is sent in a response to the client device;

whether pagination functionality is implemented in the response sent to the client device;

whether user interface elements in the response sent to the client device are pre-filled;

an image resolution of an image in the response sent to the client device;

a color depth of an image in the response sent to the client device;

whether content directed to a particular execution engine is sent in the response to the client device; and a type of markup language sent in the response to the client device.

29. The method of claim 1 further comprising:
determining one or more device capabilities of the client device via consulting a device capability repository, wherein the one or more device capabilities comprise user interface capabilities; and integrating the one or more device capabilities into the context for the client device.

30. A computerized method comprising:
   (A) during communications with a client device, determining one or more characteristics of the client device;
   (B) choosing a context for the client device based on the characteristics of the client device, wherein the context comprises a user interface context, a security context, a browser context, a custom device-specific context, and user-specific settings, wherein the context is stored;
   (C) storing an indication of the context as associated with a communications session;
   (D) receiving an indication of a transaction type from the client device;
   (E) responsive to receiving the indication of the transaction type, based on a transaction model of the transaction type, sending information for rendering a transaction request user interface for the transaction type to the client device, wherein the transaction model of the transaction type is stored in a configuration repository;
   (F) receiving a request for transaction processing from the client device, wherein the request includes one or more transaction parameters indicated in the transaction model of the transaction type;
   (G) via XML specifying a format supported by a backend transaction server, transforming the request into the format supported by the backend transaction server, thereby generating a transformed request, wherein the transaction model of the transaction type specifies how to transform the one or more transaction parameters into the format supported by the backend transaction server, wherein transforming the request comprises processing the request via the transaction model of the transaction type stored in the configuration repository, and wherein the transaction model represents a transaction via device-independent configuration information;
   (H) sending the transformed request to the backend transaction server, wherein the transformed request comprises at least one of the one or more transaction parameters;
   (I) receiving a response from the backend transaction server;
   (J) in a computing environment comprising one or more processors and memory, tailoring the received response according to the user interface context for the client device stored as associated with the communications session, thereby generating a tailored response, wherein the tailored response is renderable as a user interface on the client device and complies with the user interface context;
   (K) sending the tailored response to the client device for rendering as a user interface on the client device;
   (L) at a middleware service configured to communicate with the client device, receiving an indication of a security protocol supported by the client device; and
   (M) at the middleware service, responsive to receiving the indication of the security protocol supported by the client device, sending content to the client device via the security protocol;
   (N) wherein tailoring the received response according to the user interface context for the client device stored as associated with the communications session further comprises:
      omitting display of one or more columns in the tailored response;
      placing at least one hyperlink in the tailored response, wherein the at least one hyperlink is configured to display content from at least one of the omitted columns when activated; and
      wherein the at least one hyperlink is superimposed on response data appearing in a displayed column.

* * * * *

UNITED STATES PATENT AND TRADEMARK OFFICE
CERTIFICATE OF CORRECTION

| | | |
|---|---|---|
| PATENT NO. | : 7,783,613 B2 | Page 1 of 1 |
| APPLICATION NO. | : 11/670918 | |
| DATED | : August 24, 2010 | |
| INVENTOR(S) | : Gupta et al. | |

It is certified that error appears in the above-identified patent and that said Letters Patent is hereby corrected as shown below:

Col. 29, line 32, "desired," should read --desired.--.

Claim 21, at Col. 40, line 12, "A method" should read --A computerized method--.

Claim 28, at Col. 41, line 41, "A method" should read --A computer-implemented method--.

Signed and Sealed this
Fifth Day of July, 2011

David J. Kappos
*Director of the United States Patent and Trademark Office*